United States Patent
Runde

(10) Patent No.: US 12,459,404 B2
(45) Date of Patent: Nov. 4, 2025

(54) SEAT WITH POWER PITCH EASY ENTRY HAVING LOWER DISC ACTUATOR

(71) Applicant: Magna Seating Inc., Aurora (CA)

(72) Inventor: David M. Runde, Ortonville, MI (US)

(73) Assignee: Magna Seating Inc., Aurora (CA)

( * ) Notice: Subject to any disclaimer, the term of this patent is extended or adjusted under 35 U.S.C. 154(b) by 227 days.

(21) Appl. No.: 18/277,103

(22) PCT Filed: Feb. 14, 2022

(86) PCT No.: PCT/US2022/016322
§ 371 (c)(1),
(2) Date: Aug. 14, 2023

(87) PCT Pub. No.: WO2022/174147
PCT Pub. Date: Aug. 18, 2022

(65) Prior Publication Data
US 2024/0123873 A1    Apr. 18, 2024

Related U.S. Application Data

(60) Provisional application No. 63/148,674, filed on Feb. 12, 2021.

(51) Int. Cl.
*B60N 2/12*    (2006.01)
*B60N 2/02*    (2006.01)

(52) U.S. Cl.
CPC ........... *B60N 2/12* (2013.01); *B60N 2/02253* (2023.08)

(58) Field of Classification Search
CPC . B60N 2/12; B60N 2/02253; B60N 2002/126
USPC .......................................................... 297/341
See application file for complete search history.

(56) References Cited

U.S. PATENT DOCUMENTS

| | | | | |
|---|---|---|---|---|
| 3,853,373 | A | * 12/1974 | Corbett | B60N 2/123 |
| | | | | 297/341 |
| 3,957,312 | A | * 5/1976 | Bonnaud | B60N 2/22 |
| | | | | 297/378.12 |
| 6,964,452 | B2 | 11/2005 | Kammerer | |
| 8,424,969 | B2 | 4/2013 | Kammerer | |
| 9,108,540 | B2 | 8/2015 | Bonk et al. | |
| 10,618,444 | B2 | * 4/2020 | Kish | B60N 2/1615 |

(Continued)

FOREIGN PATENT DOCUMENTS

| | | |
|---|---|---|
| CN | 107472089 | 12/2017 |
| WO | 2018046433 | 3/2018 |

(Continued)

*Primary Examiner* — Jose V Chen
(74) *Attorney, Agent, or Firm* — Miller Canfield

(57) ABSTRACT

A pitch assembly for a vehicle seat includes a drive pinion having a slot, a pinion actuator having a key positioned within the slot, a cam fixedly coupled to the pinion actuator by a drive shaft, a drive motor operatively coupled to the drive shaft and configured to rotate the drive shaft, and an actuator lever operatively coupled to the cam and operatively coupled to a disc mechanism. The drive motor rotates the drive shaft causing the cam to move the actuator lever to an actuated position causing the disc mechanism to be unlocked prior to the key engaging with the slot. Additional rotation of the drive shaft after the key is engaged with the slot rotates the drive pinion causing the vehicle seat to be pivoted between a first and second position.

21 Claims, 14 Drawing Sheets

(56) References Cited

U.S. PATENT DOCUMENTS

| | | | |
|---|---|---|---|
| 11,338,704 B2* | 5/2022 | Rdzanek | B60N 2/12 |
| 2010/0244525 A1* | 9/2010 | Ito | B60N 2/2222 |
| | | | 297/353 |
| 2015/0336477 A1* | 11/2015 | Matsui | B60N 2/68 |
| | | | 297/344.15 |
| 2015/0375637 A1 | 12/2015 | Kikuchi et al. | |
| 2017/0334314 A1* | 11/2017 | Takada | B60N 2/02246 |
| 2018/0334054 A1* | 11/2018 | Higuchi | B60N 2/02246 |
| 2019/0143851 A1* | 5/2019 | Handigol | B60N 2/20 |
| | | | 297/341 |
| 2020/0189421 A1* | 6/2020 | Madhu | B60N 2/0881 |
| 2020/0215935 A1* | 7/2020 | Maekawa | B60N 2/12 |
| 2022/0048409 A1* | 2/2022 | Sprenger | B60N 2/067 |
| 2023/0182623 A1* | 6/2023 | Kapusky | B60N 2/3011 |
| | | | 297/362 |

FOREIGN PATENT DOCUMENTS

| | | |
|---|---|---|
| WO | 2020018986 | 1/2020 |
| WO | WO-2020018986 A1 * | 1/2020 |
| WO | 2021163659 | 8/2021 |

* cited by examiner

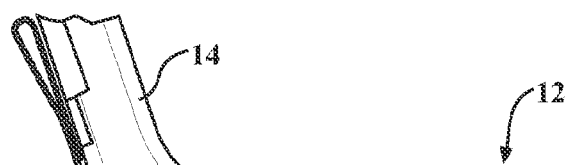
FIG. 3
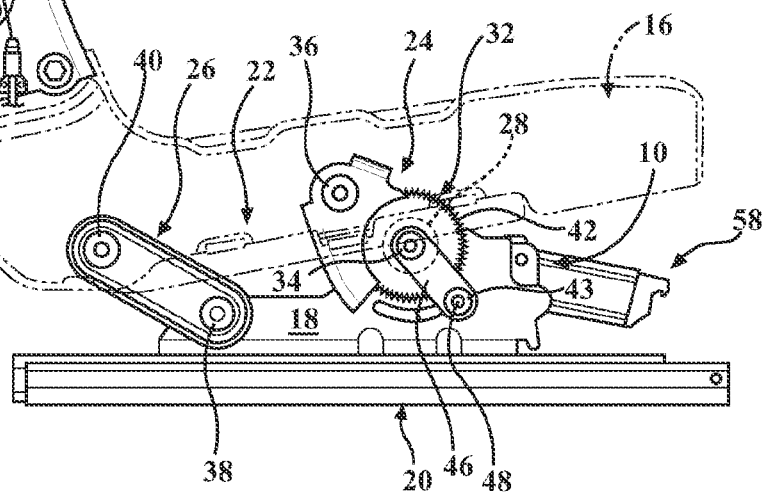
FIG. 4
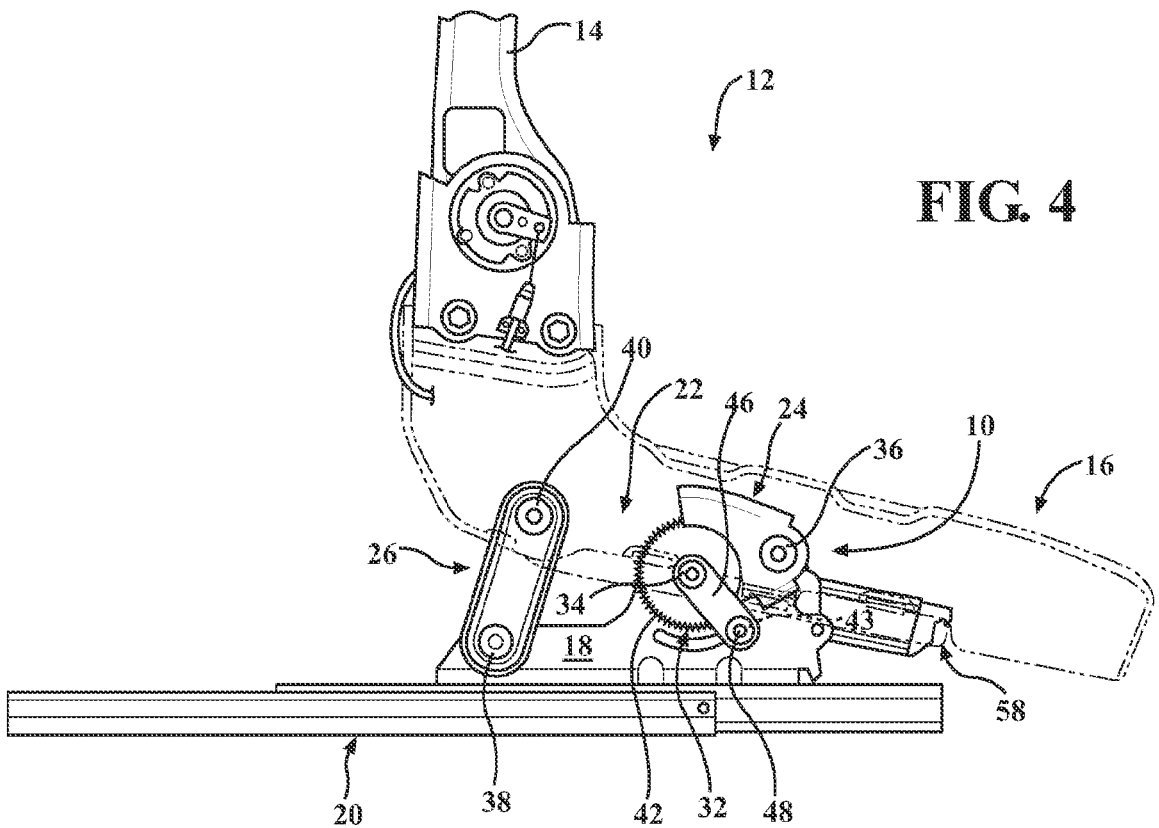

SEAT WITH POWER PITCH EASY ENTRY HAVING LOWER DISC ACTUATOR

CROSS-REFERENCE TO RELATED APPLICATIONS

This application claims priority to U.S. Provisional Application 63/148,674, filed on Feb. 12, 2021, the disclosure of which is hereby incorporated by reference in its entirety.

BACKGROUND OF THE INVENTION

1. Field of the Invention

The present invention relates to a pitch assembly for a vehicle seat. More particularly, the invention relates to a pitch assembly for a vehicle seat configured to automatically reposition the vehicle seat between two positions.

2. Description of Related Art

Vehicle seats adapted to be mounted to a floor of an automotive vehicle for movement between a plurality of positions are known in the art. Typical vehicle seats include a seat cushion for supporting an occupant in the automotive vehicle and a seat back pivotally coupled to the seat cushion. The vehicle seats also typically include a seat base adapted for mounting the vehicle seat within the automotive vehicle. At least one link extends longitudinally between a first end rotatably coupled to the seat cushion at a first pivot point and a second end rotatably coupled to the seat base at a second pivot point.

The vehicle seat is positioned in a design position for use by an occupant of the vehicle. In order to provide easy entry into a space behind the vehicle seat, certain known vehicle seats are pivotable between the design position and a pitched forward position. The pitched forward position increases the available space behind the vehicle seat for improved ingress/egress by the occupant.

Disc mechanisms are typically operatively coupled between the seat cushion and the seat base and configured to allow rotation of the seat cushion relative to the seat base when in an unlocked condition. In addition, the disc mechanisms prevent pivoting of the seat cushion towards the pitched forward position when in a locked condition.

Certain vehicle seats include a drive motor operatively coupled to the vehicle seat and configured to pivot the vehicle seat between the design position and the pitched forward position. For example, PCT Publication WO 2021/163659 A1 discloses a vehicle seat having a drive motor linked to a drive pinion that is meshingly engaged with a pitch sector for pivoting the vehicle seat between the design position and the pitched forward position. The vehicle seat includes opposing disc mechanisms configured to prevent pivoting of the vehicle seat when in the locked condition and configured to allow pivoting of the vehicle seat when in an unlocked condition. In addition, the vehicle seat includes an actuation assembly configured to reposition the disc mechanisms between the locked and unlocked conditions.

The use of an actuation assembly to unlock and relock the disc mechanisms in combination with a drive motor configured to rotate the drive pinion adds cost and complexity. It is desirable to eliminate the actuation assembly to reduce the cost of the vehicle seat. It is further desirable to reposition the disc mechanisms to the unlocked condition prior to the vehicle seat being pivoted between the design and pitched forward positions. Further, it is desirable to optionally reposition the disc mechanisms to the locked condition when the vehicle seat is pivoted to the pitched forward position. It is also desirable to reposition the disc mechanisms to the locked condition when the vehicle seat is returned to the design position from the pitched forward position.

SUMMARY OF THE INVENTION

According to one embodiment, there is provided a pitch assembly for a vehicle seat comprising a drive pinion having a slot, a pinion actuator having a key positioned within the slot, a cam fixedly coupled to the pinion actuator by a drive shaft, a drive motor operatively coupled to the drive shaft and configured to rotate the drive shaft, and an actuator lever operatively coupled to the cam and operatively coupled to a disc mechanism. The drive motor rotates the drive shaft causing the cam to move the actuator lever to an actuated position causing the disc mechanism to be unlocked prior to the key engaging with the slot. Additional rotation of the drive shaft after the key is engaged with the slot rotates the drive pinion causing the vehicle seat to be pivoted between a first and second position.

According to another embodiment, there is provided a vehicle seat pivotable between a design position and a pitched forward position and including a seat cushion pivotably coupled to a seat base, a disc mechanism operatively coupled between the seat cushion and the seat base, a pitch sector operatively to the seat cushion, and a pitch assembly operatively coupled to the pitch sector. The pitch assembly includes a drive pinion meshingly engaged with the pitch sector, a pinion actuator having a key positioned within a slot in the drive pinion, a cam fixedly coupled to the pinion actuator by a drive shaft, a drive motor operatively coupled to the drive shaft and configured to rotate the drive shaft, and an actuator lever operatively coupled to the cam and operatively coupled to the disc mechanism. When the drive motor rotates the drive shaft, the cam rotates the actuator lever causing the disc mechanism to be unlocked prior to the key engaging with the drive pinion. Additional rotation of the drive shaft after the drive pinion is coupled to the pinion actuator rotates the pitch sector and repositions the vehicle seat between the design position and the pitched forward position.

BRIEF DESCRIPTION OF THE DRAWINGS

Advantages of the present invention will be readily appreciated as the same becomes better understood by reference to the following detailed description when considered in connection with the accompanying drawings wherein:

FIG. 3 is a right side view of the vehicle seat of FIG. 2 in the design position;

FIG. 4 is a right side view of the vehicle seat of FIG. 3 pivoted to a pitched forward position;

DETAILED DESCRIPTION OF THE EMBODIMENTS

Figure 1:
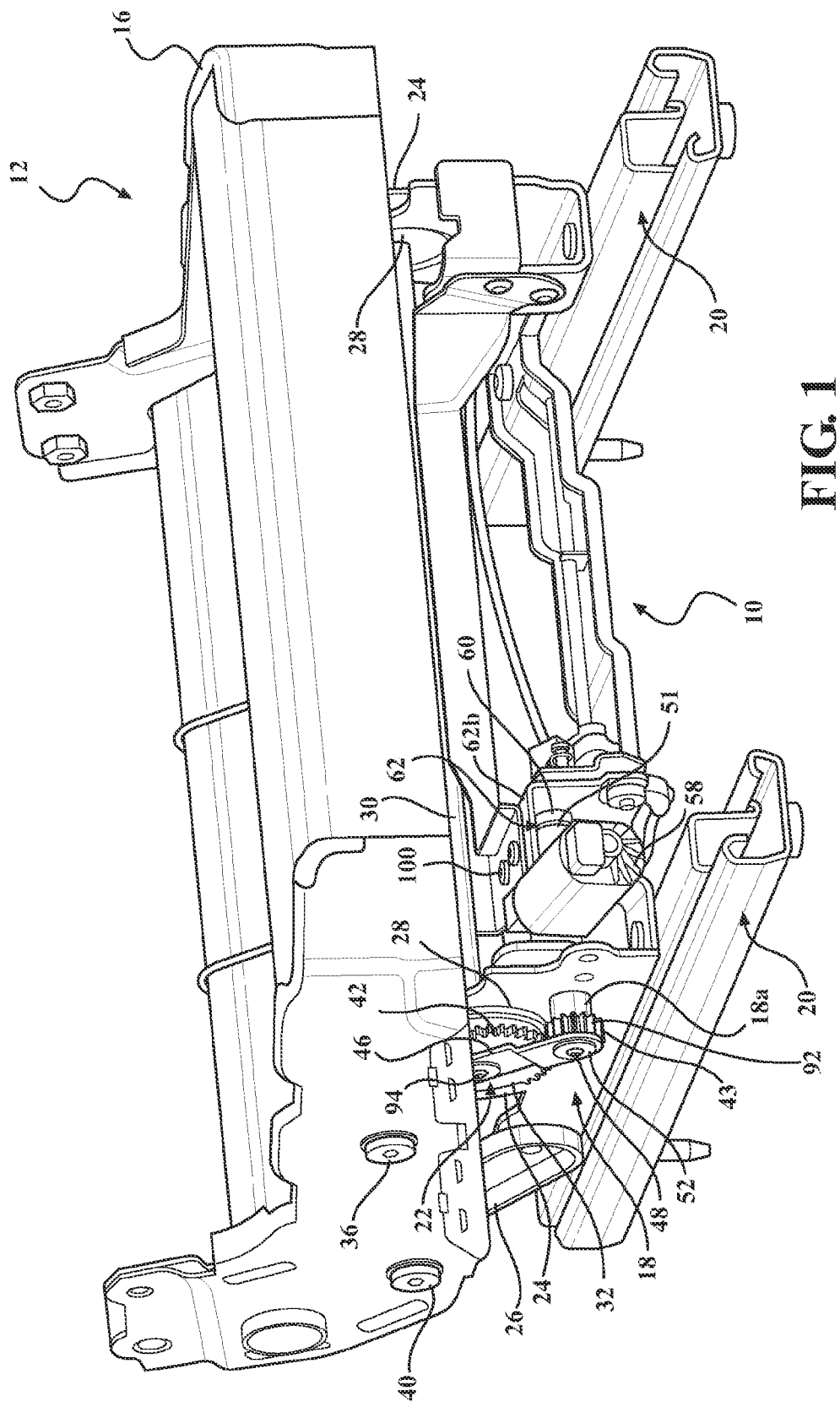
FIG. 1 is a perspective view of a portion of a vehicle seat having a pitch assembly according to one embodiment of the present invention.

FIGS. 1-23 illustrate a pitch assembly 10, 10' for a vehicle seat 12 for use in an automotive vehicle according to embodiments described herein. Directional references employed or shown in the description, figures, or claims, such as top, bottom, upper, lower, upward, downward, lengthwise, widthwise, left, right, and the like, are relative terms employed for ease of description and are not intended to limit the scope of the invention in any respect. Referring to the Figures, like numerals indicate like or corresponding parts throughout the several views.

As depicted in FIGS. 1 through 6, the pitch assembly 10 is configured to be attached to the vehicle seat 12. The vehicle seat 12 includes a seat back 14, a seat cushion 16, a seat base 18, a pair of adjuster assemblies 20, a linkage assembly 22 with opposing front and rear links 24, 26, opposing disc mechanisms 28, a cross tube 30, and a pitch sector 32. The seat back 14 is rotatably coupled to the seat cushion 16. The linkage assembly 22 pivotably couples the seat cushion 16 to the seat base 18. In addition, the seat base 18 is transposable fore and aft along the pair of adjuster assemblies 20. It is to be appreciated that certain vehicle seats 12 lack the adjuster assemblies 20 shown in FIG. 1 without departing from the scope of the present invention.

Figure 2:
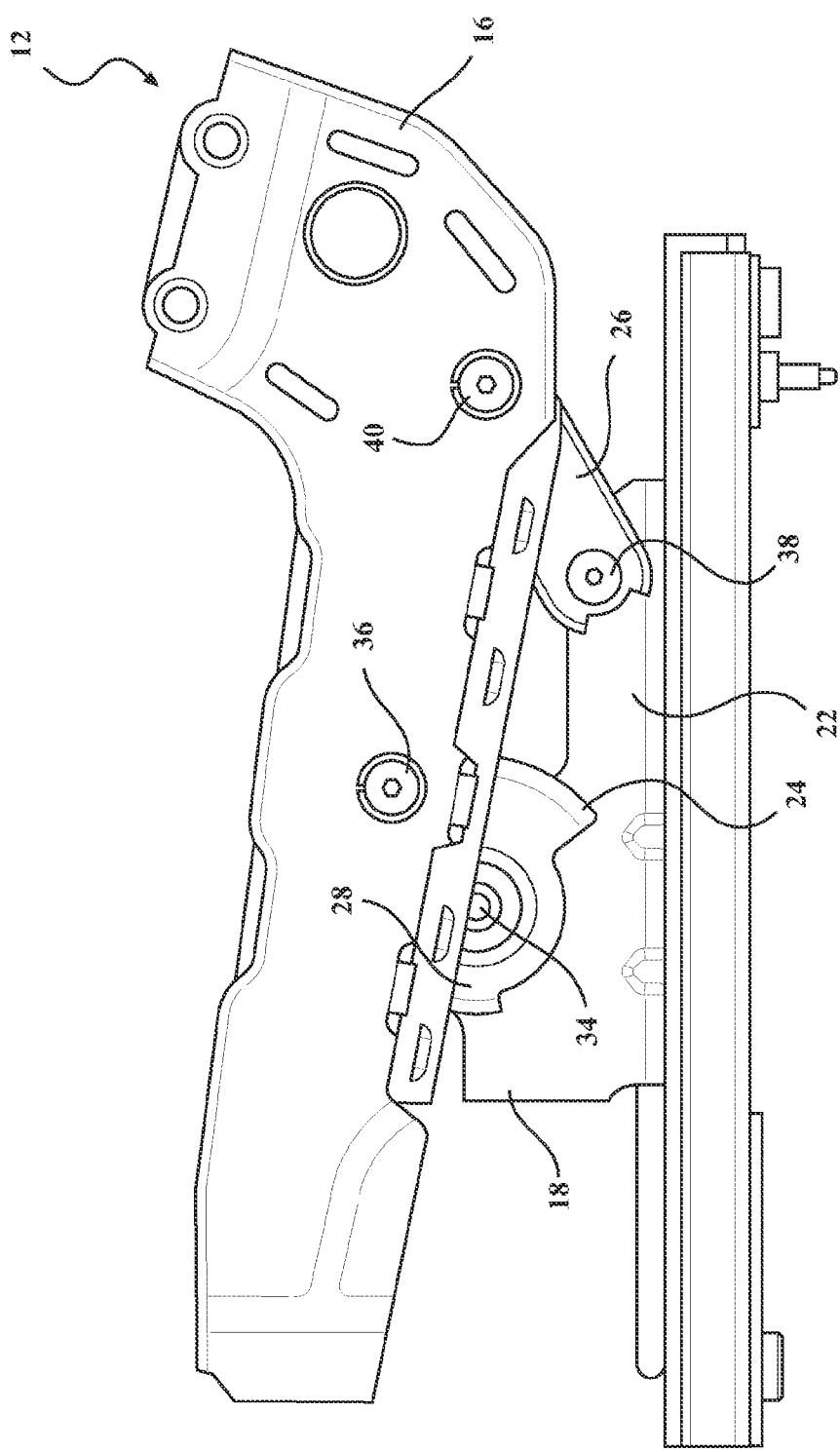
FIG. 2 is a left side view of the vehicle seat of FIG. 1 in a design position.

As best shown in FIGS. 2 and 3, the linkage assembly 22 is a four-bar linkage having laterally spaced apart front links 24 and opposing laterally spaced apart rear links 26. Each of the front links 24 has a lower end rotationally coupled to a front portion of the seat base 18 by a lower pivot 34 and an upper end rotationally coupled to a front portion of the seat cushion 16 by an upper pivot 36. In addition, each of the rear links 26 has a lower end rotationally coupled to a rear portion of the seat base 18 by a lower pivot 38 and an upper end rotationally coupled to a rear portion of the seat cushion 16 by an upper pivot 40. Each one of the front links 24 and each one of the rear links 26 are substantially the same. However, it is to be appreciated that the linkage assembly 22 can include any suitable number of links or link pairs without varying the scope of the invention.

Referring to FIGS. 2 and 3, each of the disc mechanisms 28 is operatively coupled between the respective front links 24 and the seat base 18. The cross tube 30 (FIG. 1) is operatively coupled to the opposing disc mechanisms 28 through the lower pivots 34. In addition, it is to be appreciated that the disc mechanisms 28 can be operatively coupled between the front or rear links 24, 26 and the seat cushion 16 or the seat base 18 at any of the rotatable connections within the linkage assembly 22 without altering the scope of the invention. Depicted in FIG. 6, a release lever 28a is operatively coupled to each of the disc mechanisms 28.

The pitch sector 32 is fixedly coupled to the lower end of the front links 24 on an outboard side of the vehicle seat 12, as shown in FIG. 3. The pitch sector 32 has a radial center aligned with an axis of rotation of the lower pivots 34. A plurality of gear teeth 42 extend around at least a portion of an outer periphery of the pitch sector 32. It is to be appreciated that the pitch sector 32 can be fixedly coupled to the front link on either of the outboard side or an inboard side of the vehicle seat 12 without varying the scope of the invention. Further, it is to be appreciated that the pitch sector 32 can be fixedly coupled to other locations on the seat cushion 16 or to other locations in the linkage assembly 22 without altering the scope of the invention.

Referring to FIGS. 1-10, the pitch assembly 10 includes a drive pinion 43, a gear strap 46, an attachment screw 48, a drive shaft 51, a lateral washer 52, an outer bushing 53, a pinion actuator 56, a drive motor 58, a shaft bearing 60, a bracket 62, a cam 64, an inner bushing 66, a spring screw 68, a medial washer 70, an actuator lever 72, a pivot bolt 74, a pivot spacer 75, a weld nut 78, a spring pin 80, a return spring 82, and a rivet 84. Operatively coupled to the pitch assembly 10 is a cable assembly 86, secondary cable assemblies 86', and a splitter 86a. The cable assembly 86 and the secondary cable assemblies 86' include Bowden cables 88, 88' and cable conduits 90, 90'.

Figure 7:
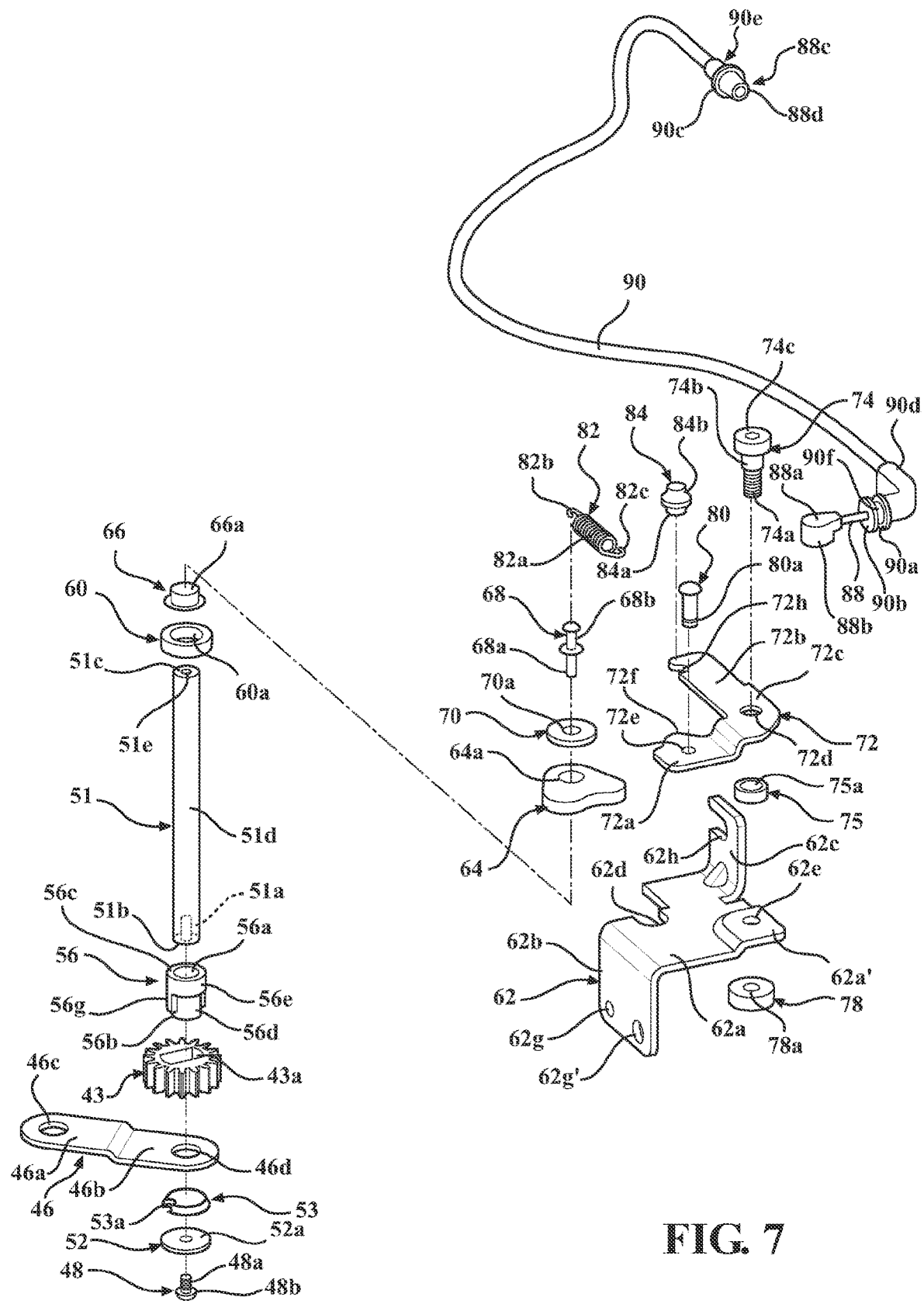
FIG. 7 is an exploded perspective view of the pitch assembly of FIG. 5.

Depicted in FIG. 1, gear teeth 92 extending around an outer periphery of the drive pinion 43 are meshingly engaged with the gear teeth 42 on the pitch sector 32. In addition, the drive pinon 43 is rotationally coupled to a boss 18a protruding laterally from the seat base 18. The gear teeth 92 of the drive pinion 43 are retained in meshing engagement with the gear teeth 42 of the pitch sector 32 by the gear strap 46. Referring to FIGS. 1 and 7, the gear strap 46 is an elongated bracket having an upper portion 46a offset from a lower portion 46b. The offset between the upper and lower portions 46a, 46b is sized and shaped such that the gear strap 46 can be simultaneously coupled to both the pitch sector 32 and the drive pinion 43. More specifically, each of the upper and lower portions 46a, 46b include a hole 46c, 46d sized and shaped to align with the axis of rotation of the pitch sector 32 and the drive pinion 43, respectively.

The gear strap 46 is rotationally coupled at an upper end to the pitch sector 32 by a mechanical fastener 94, as depicted in FIG. 1. The mechanical fastener 94 extends through the upper hole 46c in the gear strap 46 and couples the upper portion 46a of the gear strap 46 to the pitch sector 32. One or more washers and/or bushings can be included between the mechanical fastener 94 and the pitch sector 32 so the pitch sector 32 is rotatable relative to the gear strap 46.

Figure 5:
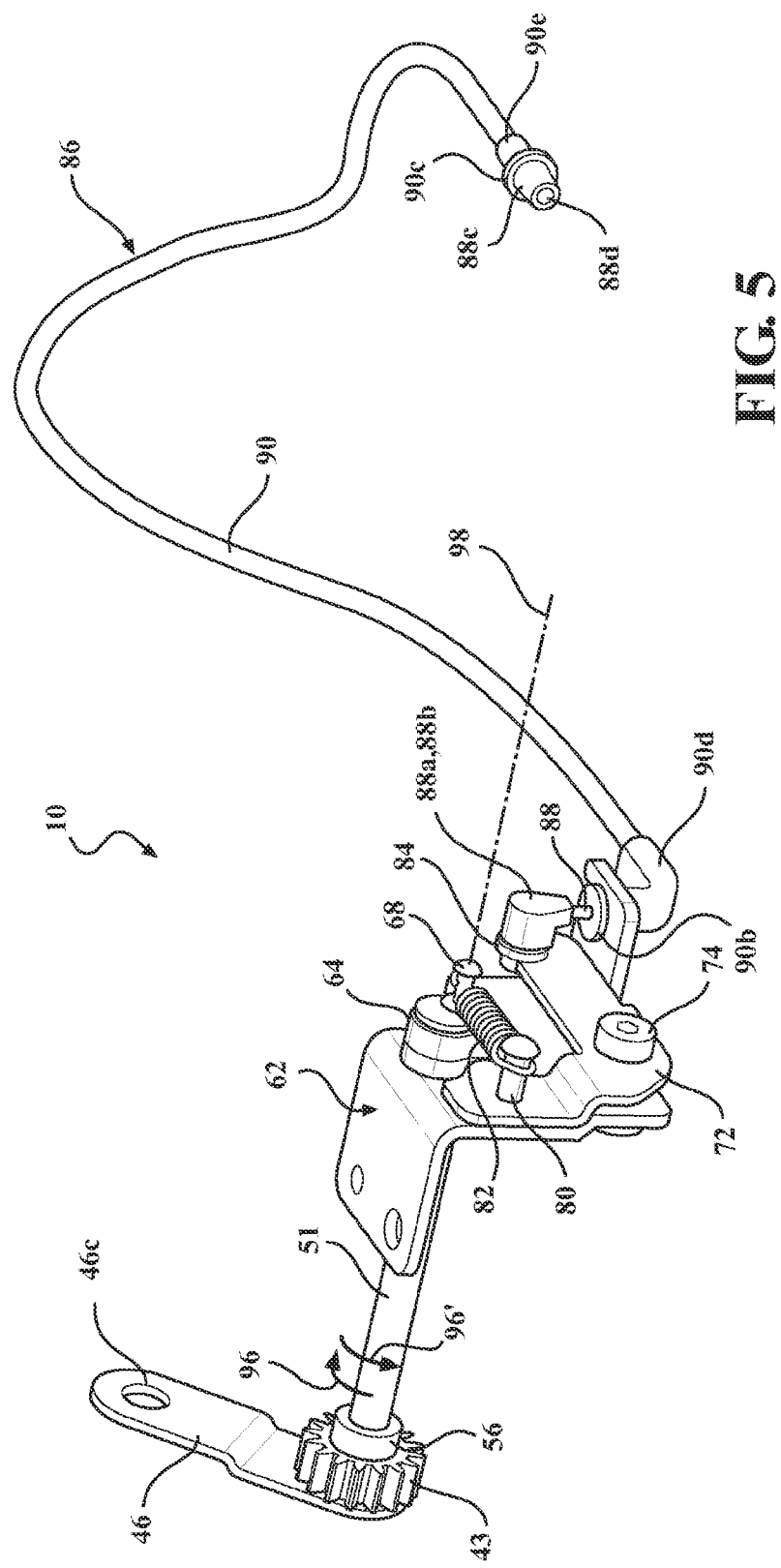
FIG. 5 is a perspective view of the pitch assembly of FIG. 1 with the drive motor omitted.

Referring to FIG. 7, the attachment screw 48 rotationally couples the gear strap 46 to the drive shaft 51. The attachment screw 48 includes a threaded shaft 48a extending from a screw head 48b. The threaded shaft 48a is sized and shaped to meshingly engage with a lateral aperture 51a that extends axially from a lateral end 51b of the drive shaft 51. In addition, the threaded shaft 48a is sized and shaped to pass through the lower hole 46d in the gear strap 46, through a hole 52a in the lateral washer 52, through a hole 53a in the outer bushing 53, and through an aperture 56a in the pinion actuator 56. Referring to FIGS. 5 and 7, the pinion actuator 56 is fixedly coupled to the lateral end 51b of the drive shaft 51. Further, the pinion actuator 56 is inserted into a slot 43a in the drive pinion 43. As depicted in FIG. 5, the drive pinion 43 is selectively operatively coupled to the lateral end 51b (FIG. 7) of the drive shaft 51 via the pinion actuator 56. The interaction between the pinion actuator 56 and the drive pinion 43 is further described below.

The threaded shaft 48a of the attachment screw 48, shown in FIG. 7, is passed through the hole 52a in the lateral washer 52 and through the hole 53a in the outer bushing 53 such that the lateral washer 52 is spaced between the screw head 48b of the attachment screw 48 and the outer bushing 53. In addition, the threaded shaft 48a is passed through the lower hole 46d in the gear strap 46, inserted into the aperture 56a in the pinion actuator 56, and fixedly coupled to the lateral aperture 51a in the drive shaft 51. As such, the gear strap 46 is spaced between the outer bushing 53 and the drive pinion 43 when the attachment screw 48 is assembled with the drive shaft 51. The attachment screw 48, the lateral washer 52, the outer bushing 53, the gear strap 46, the drive pinion 43, the pinion actuator 56, and the drive shaft 51 are sized and shaped such that the attachment screw 48 is fixedly coupled to the drive shaft 51 while rotationally coupling the drive pinion 43 to the gear strap 46.

Referring to FIG. 1, the drive shaft 51 is operatively coupled to the drive motor 58 with the drive motor 58 being fixedly coupled to the seat base 18. The drive motor 58 is configured to rotate the drive shaft 51 in a forward direction 96 and a reverse direction 96' (shown in FIG. 5) as is generally known in the art. In addition, a wiring harness (not shown) is electrically connected to the drive motor 58 to selectively provide power to the drive motor 58.

A medial end 51c (FIG. 7) of the drive shaft 51 is rotationally coupled to the shaft bearing 60 that is supported and contained by the bracket 62. The drive shaft 51 has a generally cylindrical elongated shape with an external spline 51d extending around an outer periphery of the drive shaft 51 between the lateral and medial ends 51b, 51c. The lateral end 51b of the drive shaft 51 is configured to matingly engage with the aperture 56a in the pinion actuator 56 so that the pinion actuator 56 rotates with the drive shaft 51. In addition, the medial end 51c of the drive shaft 51 is configured to matingly engage with an aperture 64a in the cam 64 so that the cam 64 also rotates with the drive shaft 51. Each of the shaft bearing 60 and the inner bushing 66 includes a passageway 60a, 66a extending axially therethrough which are sized and shaped such that the medial end 51c of the drive shaft 51 can be passed through both the shaft bearing 60 and the inner bushing 66. Referring to FIGS. 5 and 7, the medial end 51c of the drive shaft 51 is passed through the passageway 60a in the shaft bearing 60 and through the passageway 66a in the inner bushing 66 prior to fixedly coupling the cam 64 to the drive shaft 51. The inner bushing 66 is spaced between the shaft bearing 60 and the cam 64.

The cam 64 is fixedly coupled to the drive shaft 51 by the spring screw 68. The spring screw 68 includes a threaded shaft 68a extending from a stud portion 68b. The threaded shaft 68a is inserted through a hole 70a extending axially through the medial washer 70, into the aperture 64a in the cam 64, and into a medial aperture 51e in the drive shaft 51. The threaded shaft 68a of the spring screw 68 is fixedly coupled to medial aperture 51e in the drive shaft 51. The hole 70a extending axially through the medial washer 70 is sized and shaped such that the threaded shaft 68a of the spring screw 68 can be inserted through the hole 70a. Further, the threaded shaft 68a of the spring screw 68 is sized and shaped such that the threaded shaft 68a can matingly engage with the medial aperture 51e extending axially from the medial end 51c of the drive shaft 51. It is to be appreciated that the medial end 51c of the drive shaft 51 can be positioned flush with a medial side of the cam 64 or recessed in the cam aperture 64a without varying the scope of the invention. While not shown in the Figures, the cam aperture 64a can include an internal stop and/or the medial end 51c of the drive shaft 51 can include an external stop such that the cam 64 is positioned at a predetermined location on the drive shaft 51 without varying the scope of the invention.

As depicted in FIG. 7, the bracket 62 includes a central portion 62a extending at generally a right angle from an upper portion 62b and includes a bracket tab 62c extending at generally a right angle from the central portion 62a. The upper portion 62b and the bracket tab 62c are generally parallel to each other. The central portion 62a of the bracket 62 includes a C-shaped slot 62d configured to matingly engage with a portion of an outer periphery of the shaft bearing 60. Referring to FIGS. 5 and 7, the shaft bearing 60 is slid into the C-shaped slot 62d such that the bracket 62 supports and contains the shaft bearing 60. The cam 64 is spaced apart from the bracket 62 when the shaft bearing 60 is assembled with the C-shaped slot 62d. The drive shaft 51 and the attached cam 64 can freely rotate with respect to the bracket 62 due to the inclusion of the shaft bearing 60 and the inner bushing 66. The cam 64 rotates about a primary axis 98 passing axially through the drive shaft 51 and the pinion actuator 56, as best shown in FIG. 5. The primary axis 98 defines a common axis of rotation for the drive shaft 51, the pinion actuator 56, the drive pinion 43, and the cam 64.

As shown in FIGS. 5 and 7, spaced apart mounting holes 62g, 62g' extend between opposing surfaces of the upper portion 62b of the bracket 62. Depicted in FIG. 1, mechanical fasteners 100 are inserted through holes (not shown) in the seat base 18 and into the respective mounting holes 62g, 62g' in the bracket 62 to fixedly couple the bracket 62 to the seat base 18. It is to be appreciated that the bracket 62 can be fixedly coupled to or integrally formed with the seat base 18 or another component of the vehicle seat 12 without departing from the scope of the invention.

Referring to FIG. 7, the central portion 62a of the bracket 62 includes an offset portion 62a' having a central hole 62e for mounting the actuator lever 72 to the bracket 62. The actuator lever 72 is a generally L-shaped bracket with upper and lower portions 72a, 72b projecting from a central portion 72c. The upper portion 72a extends at approximately a right angle from the lower portion 72b. Further, the upper portion 72a is offset laterally from the lower portion 72b. A pivot hole 72d extends laterally through the central portion 72c of the actuator lever 72. In addition, a mounting hole 72e extends laterally through the upper portion 72a of the actuator lever 72.

The pivot bolt 74 rotationally couples the actuator arm to the bracket 62. The pivot bolt 74 includes a threaded shaft 74a extending from a stud portion 74b which projects from a bolt head 74c. The pivot bolt 74 is configured such that the threaded shaft 74a and the stud portion 74b will pass through the pivot hole 72d in the actuator lever 72. The stud portion 74b and the pivot hole 72d are sized and shaped such that the actuator lever 72 is rotationally coupled to the stud portion 74b when assembled. The threaded shaft 74a is passed through the pivot hole 72d in the actuator lever 72, through a hole 75a extending axially through the pivot spacer 75, through the central hole 62e in the bracket 62 and meshingly engaged with a threaded hole 78a in the weld nut 78. In certain embodiments the weld nut 78 is fixedly coupled to the bracket 62 by a weld.

Figure 9:
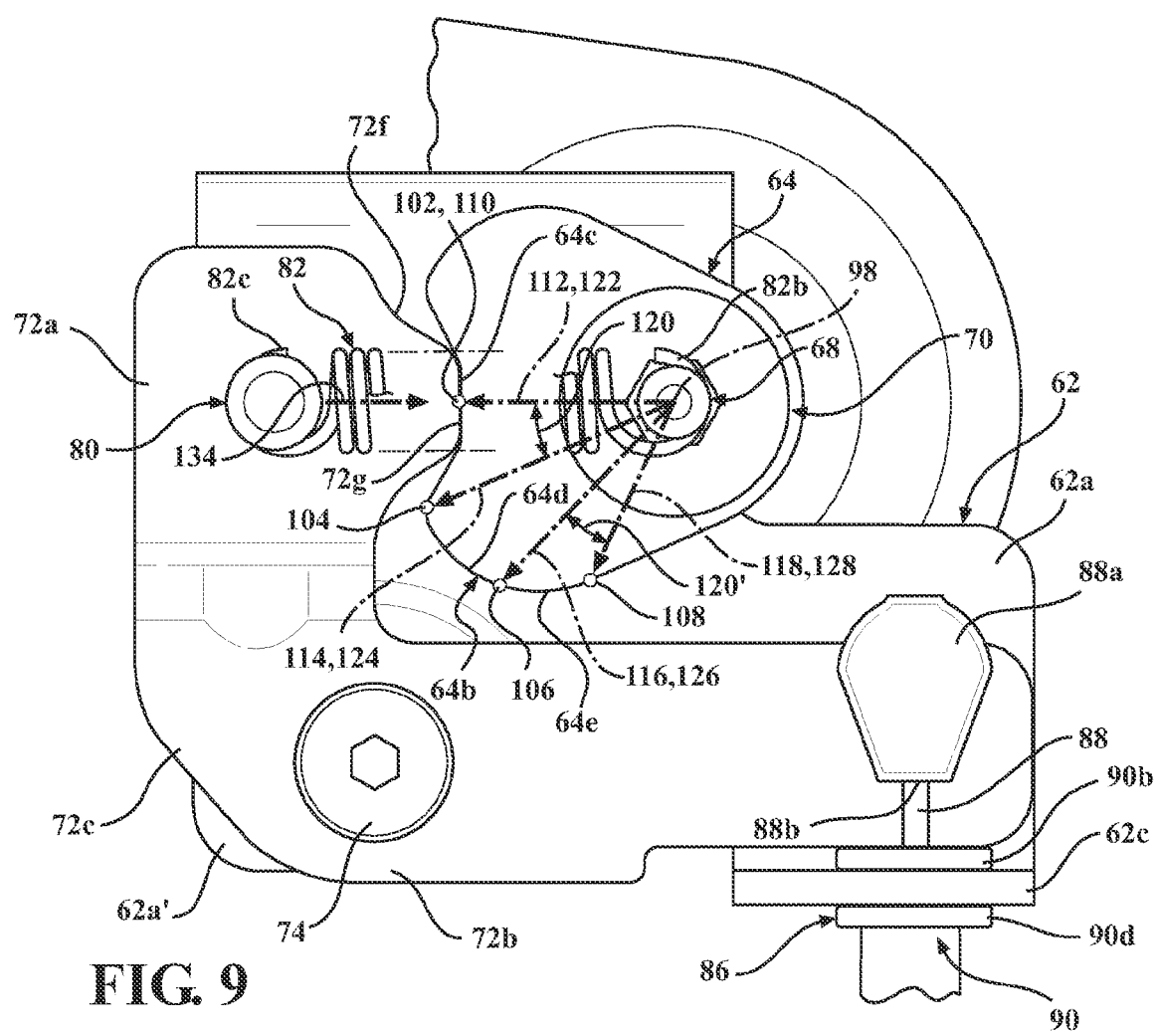
FIG. 9 is an enlarged left side view of portion 9 of the pitch assembly of FIG. 8 with the pitch assembly in the design position.

As shown in FIG. 9, the actuator lever 72 includes a boss 72f extending from one side of the upper portion 72a of the actuator lever 72. The boss 72f includes a cam follower 72g forming a distal end of the boss 72f As illustrated in FIG. 9, the cam follower 72g is configured to frictionally engage with a cam profile 64b extending at least partially along an outer perimeter of the cam 64.

Referring to FIG. 7, the spring pin 80 is fixedly coupled to the mounting hole 72e in the actuator lever 72. The spring pin 80 has a generally cylindrical shape with a base 80a configured to be fixedly coupled to the mounting hole 72e in the actuator lever 72. The spring pin 80 is shown fixedly coupled to the actuator lever 72 in FIG. 5. In addition, the return spring 82 is operatively coupled between the spring pin 80 and the spring screw 68. As depicted in FIGS. 7 and 9, the return spring 82 is a coil spring having a coiled portion 82a extending between opposing spring ends 82b, 82c. Each of the spring ends 82b, 82c includes a C-shaped loop portion. The spring ends 82b, 82c are looped around the respective spring screw 68 and spring pin 80 during assembly. The return spring 82 spring-biases the upper portion 72a of the actuator lever 72 towards the cam 64 (arrow 134) such that the cam follower 72g is frictionally engaged with the cam profile 64b.

The cam profile 64b shown in FIG. 9 includes a home portion 64c, a dwell portion 64d, and a release portion 64e. A contact point 102 between the center of the cam follower 72g and the cam profile 64b when the pitch assembly 10 is in the design position defines a home position 110 of the cam profile 64b. An imaginary line extending between the home position 110 and the primary axis 98 of the cam 64 defines a home angle 112 of the cam profile 64b. The home position 110 is spaced apart from the primary axis 98 by a radial distance 122. The cam profile 64b includes a trigger point 104 defining a transition between the home portion 64c and the dwell portion 64d, a release point 106 defining a transition between the dwell portion 64d and the release portion 64e, and an end point 108 defining a distal end of the release portion 64e. An imaginary line extending between the trigger point 104 and the primary axis 98 defines an actuated angle 114. The trigger point 104 is spaced apart from the primary axis 98 by a radial distance 124. An imaginary line extending between the release point 106 and the primary axis 98 defines a release angle 116. The release point 106 is spaced apart from the primary axis 98 by a radial distance 126. Further, an imaginary line extending between the end point 108 and the primary axis 98 defines an end angle 118. The end point 108 is spaced apart from the primary axis 98 by a radial distance 128. The radial distances 122 and 128 are less than the radial distances 124 and 126. The angular distance between the home angle 112 and the actuated angle 114 defines an unlatch angle 120. Similarly, the angular distance between the release angle 116 and the end angle 118 defines a return unlatch angle 120'.

Figure 10:
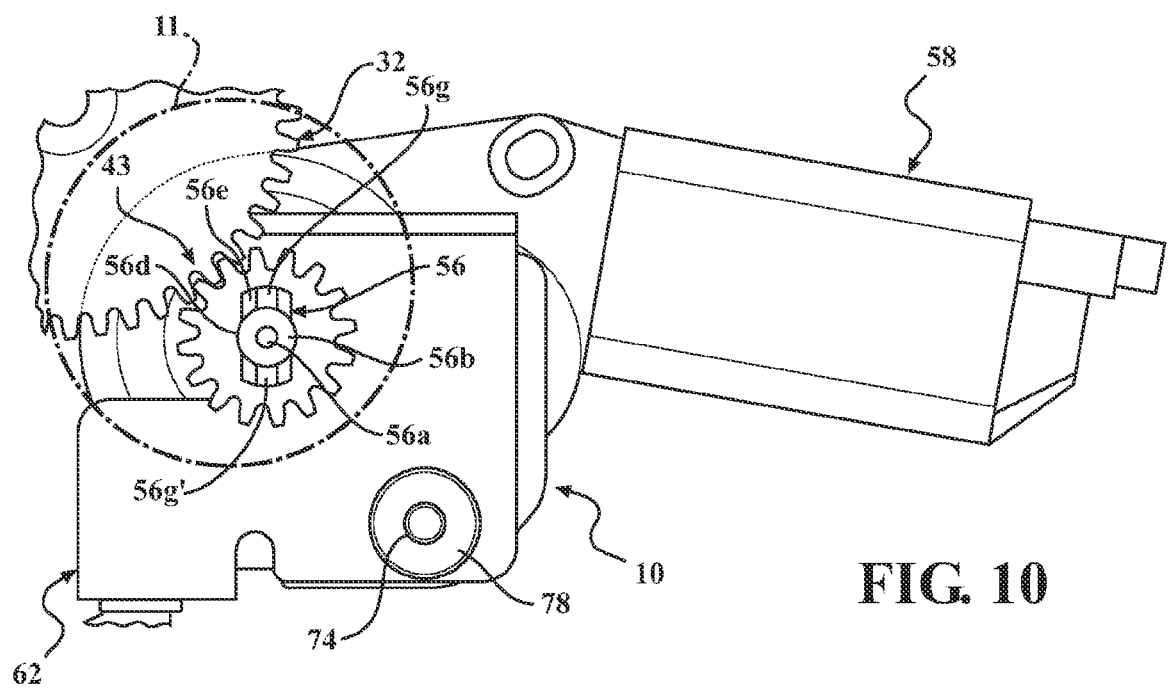
FIG. 10 is right side view of the pitch assembly of FIG. 8 with the pitch assembly in the design position.

Additional details of the pinion actuator 56 and the drive pinion 43 are described in more detail with reference to FIGS. 7, 10, and 11. Referring to FIGS. 7 and 10, the pinion actuator 56 has a generally cylindrical shape extending between lateral and medial ends 56b, 56c. A lateral portion 56d extends from a medial portion 56e of the pinion actuator 56 with the lateral portion 56d having an outer diameter smaller than an outer diameter of the medial portion 56e. Extending from the lateral portion 56d of the pinion actuator 56 are opposing keys 56g, 56g'. The opposing keys 56g, 56g' adjoin the medial portion 56e of the pinion actuator 56. The aperture 56a extends axially through the pinion actuator 56 between the lateral and medial ends 56b, 56c. The lateral end Ma of the drive shaft 51 and the aperture 56a in the pinion actuator 56 are configured such that the drive shaft 51 matingly engages with the aperture 56a in the pinion actuator 56 when assembled.

Figure 11:
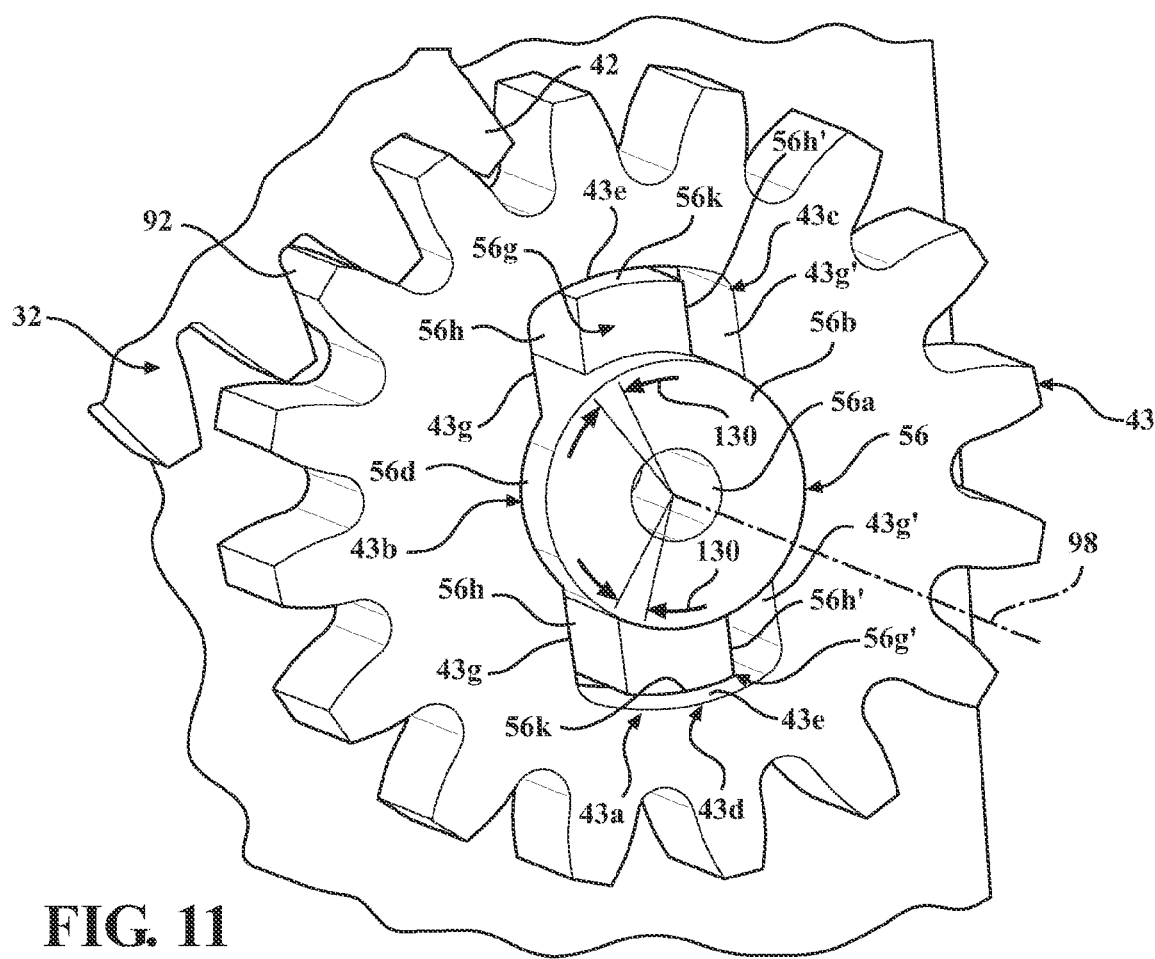
FIG. 11 is an enlarged right side view of portion 11 of the pitch assembly of FIG. 10 showing a pinion actuator decoupled from a drive pinion.

The lateral portion 56d of the pinion actuator 56 is configured to fit within the slot 43a in the drive pinion 43, as best depicted in FIG. 11. The slot 43a includes a central portion 43b and opposing wing portions 43c, 43d extending from the central portion 43b. The central portion 43b has generally cylindrical shape. Each of the opposing wing portions 43c, 43d includes an end wall 43e extending between opposing side walls 43g, 43g'. In the embodiment shown in FIG. 11, each of the end walls 43e has a curved shape with the opposing side walls 43g, 43g' being generally parallel to each other. However, it is to be appreciated that the shape of the wing portions 43c, 43d can include alternate geometries without varying the scope of the invention. The opposing side walls 43g, 43g' of the wing portions 43c, 43d adjoin the central portion 43b forming a single elongated slot 43a.

The central portion 43b of the slot 43a and the lateral portion 56d of the pinion actuator 56 are sized and shaped such that the lateral portion 56d of the pinion actuator 56 matingly engages with central portion 43b of the slot 43a. Further, each of the keys 56g, 56g' is sized and shaped such that the keys 56g, 56g' fit within the respective wing portions 43c, 43d of the slot 43a when the lateral portion 56d of the pinion actuator 56 is inserted into the central portion 43b of the slot 43a. Each key 56g, 56g' includes opposing side walls 56h, 56h' projecting from the lateral portion 56d of the pinion actuator 56. In addition, each key 56g, 56g' includes an end wall 56k adjoining the opposing side walls 56h, 56h'. In the embodiment shown in FIG. 11, the end wall 56k of each key 56g, 56g' has a curved shape and is offset from the respective end wall 43e of the slot 43a when assembled. However, it is to be appreciated that the end walls 56k of each key 56g, 56g' can be sized and shaped to matingly engage with the respective end wall 43e of the slot 43a without altering the scope of the invention.

As also illustrated in FIG. 11, a lateral distance between the opposing side walls 56h, 56h' of the keys 56g, 56g' is less than a lateral distance between the opposing side walls 43g, 43g' of the slot 43a. As such, when the pinion actuator 56 is in the design position shown in FIG. 11, the pinion actuator 56 is rotatable relative to the drive pinion 43 within a dwell angle 130 without the pinion actuator 56 coupling with the drive pinion 43. The dwell angle 130 comprises a predetermined number of degrees before the pinion actuator 56 is coupled to the drive pinion 43 when rotated from the design position. The pinion actuator 56 engages the drive pinion 43 when one of the side walls 56h, 56h' of the keys 56g, 56g' frictionally engage with the adjacent side walls 43g, 43g' of the slot 43a. The relative motion of the pinion actuator 56 with respect to the drive pinion 43 is further described below. In addition, the unlatch angle 120 of the cam profile 64b (shown in FIG. 9) is selected to be less than the dwell angle 130 of the pinion actuator 56 with respect to the slot 43a in the drive pinion 43 to ensure that the disc mechanisms 28 are repositioned to the unlocked condition prior to the pinion actuator 56 engaging with the drive pinion 43.

Figure 13:
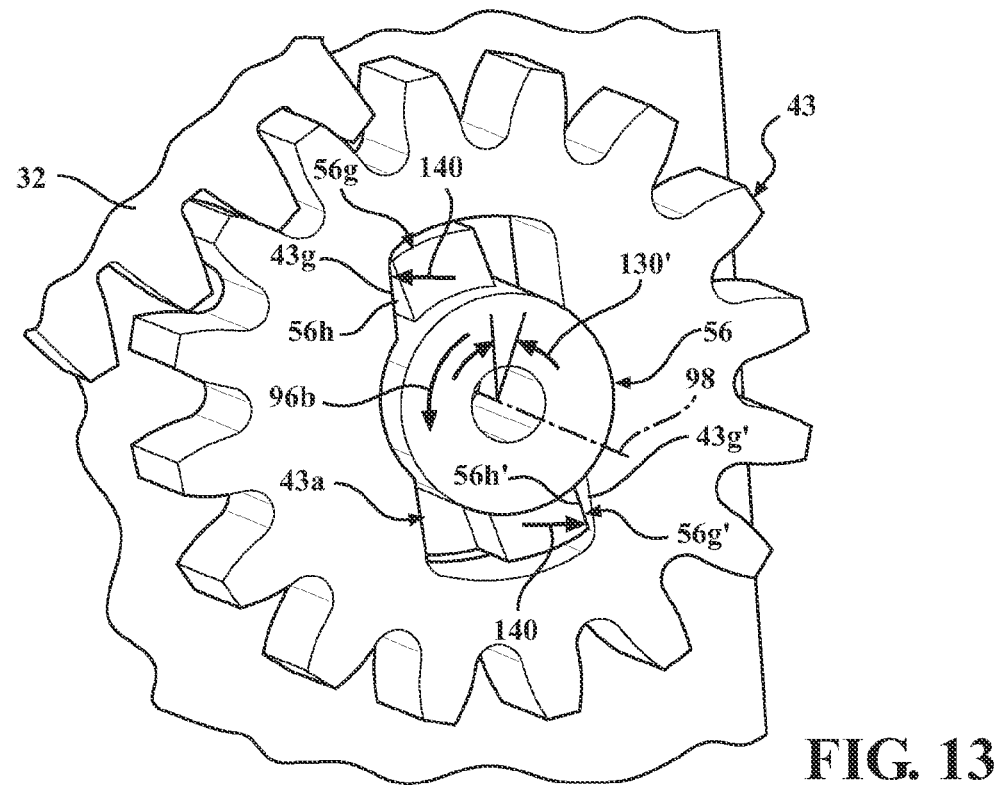
FIG. 13 is a right side view of the pitch assembly of FIG. 11, showing the pinion actuator engaged with the drive pinion.
Figure 14:
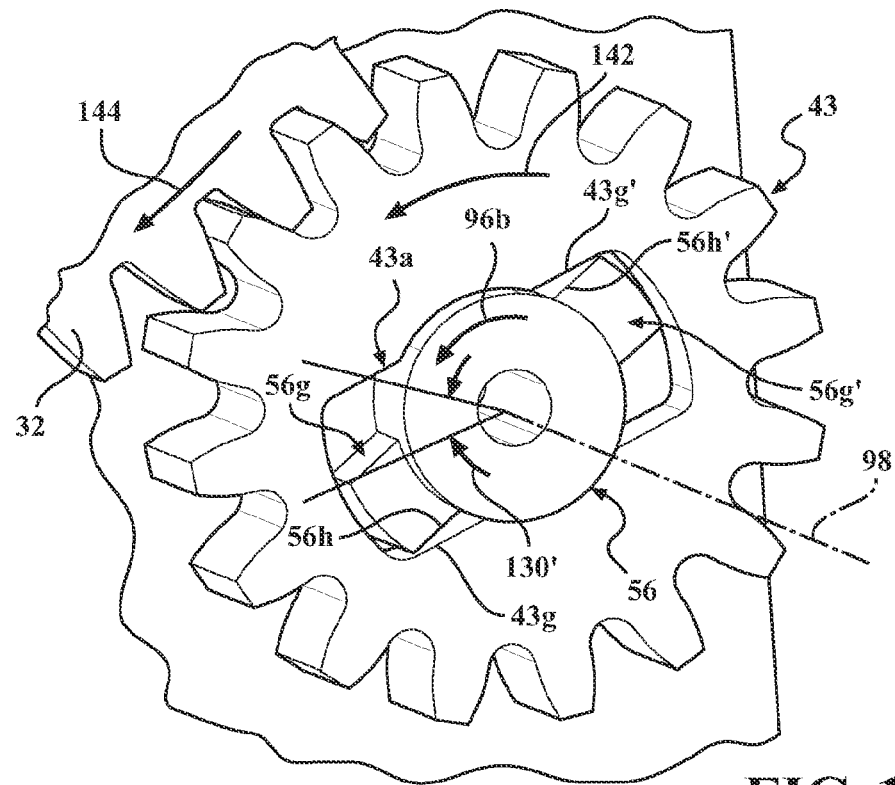
FIG. 14 is a right side view of the pitch assembly of FIG. 13, showing the pinion actuator, the drive pinion, and the pitch sector partially rotated.

FIG. 13 shows the pinion actuator 56 rotated such that the keys 56g, 56g' frictionally engage with the adjacent side walls 43g, 43g' of the slot 43a in the drive pinion 43. When the pinion actuator 56 is engaged with the drive pinion 43 and the drive shaft 51 rotational direction is reversed, the pinion actuator 56 is rotatable within a reverse dwell angle 130' without the pinion actuator 56 engaging with the slot 43a in the drive pinion 43.

Also shown in FIG. 7, a base portion 84a of the rivet 84 is fixedly coupled with a rivet slot 72h in an upper edge of the lower portion 72b of the actuator lever 72. The rivet 84 is a nail head rivet having a nail head 84b extending from the base portion 84a.

Figure 6:
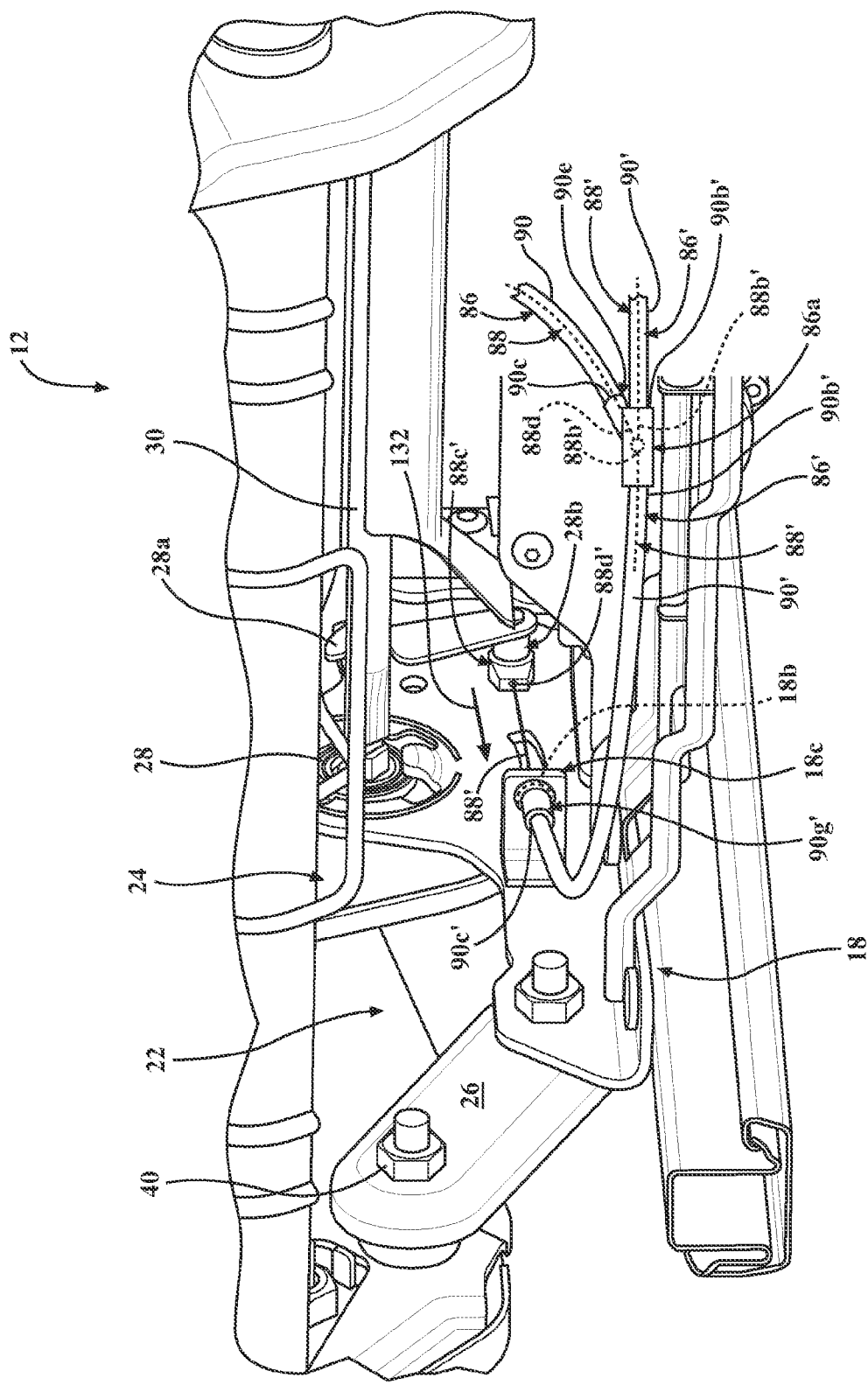
FIG. 6 is an enlarged rear perspective view of a portion of the vehicle seat of FIG. 1 with the vehicle seat in the design position.

The cable assembly 86 is operatively coupled to both disc mechanisms 28 through a splitter 86a and secondary cable assemblies 86' as is generally known in the art. Referring to FIGS. 5 through 7, the Bowden cable 88 of the cable assembly 86 passes through a passageway 90a in the cable conduit 90 between proximal and distal ends 90b, 90c of the cable conduit 90. A rivet connector 88a is fixedly coupled to a proximal end 88b of the Bowden cable 88. Further, a splitter connector 88c is fixedly coupled to a distal end 88d of the Bowden cable 88. The rivet connector 88a is configured be fixedly coupled with the nail head 84b of the rivet 84. FIG. 5 depicts the rivet connector 88a of the Bowden cable 88 fixedly coupled to the rivet 84.

The cable conduit 90 includes a conduit connector 90d and a splitter connector 90e fixedly coupled to the respective proximal and distal ends 90b, 90c of the cable conduit 90. A connector slot 90f extends around an outer periphery of the conduit connector 90d. The connector slot 90f is configured to matingly engage with a cable slot 62h in the bracket tab 62c. The connector slot 90f in the conduit connector 90d is inserted into the cable slot 62h to fixedly couple the conduit connector 90d to the bracket tab 62c. In addition, the splitter connector 90e is fixedly coupled to the splitter 86a.

Referring to FIG. 6, each of the secondary cable assemblies 86' include a secondary Bowden cable 88' passing longitudinally through a passageway (not shown) in the respective secondary conduit 90' between proximal and distal ends 90b', 90c' of the secondary conduit 90'. The proximal end 90b' of the secondary conduits 90' are fixedly coupled to the splitter 86a. The distal end 90c' of the secondary conduits 90' are fixedly coupled to a respective mounting connector 90g'. Each of the mounting connectors 90g' is fixedly coupled to a hole 18b passing through a respective bracket 18c extending from the seat base 18. In addition, a proximal end 88b' of both secondary Bowden cables 88' are operatively coupled to the distal end 88d of the Bowden cable 88 through the splitter 86a as is generally known in the art. Further, a distal end 88d' of each secondary Bowden cable 88' is fixedly coupled to a respective lever connector 88c'. The lever connectors 88c' are configured to fixedly couple with a stud 28b projecting from a lower portion of the respective release lever 28a. Alternatively, the cable assembly 86 can be operatively coupled to a single disc mechanism 28 without varying the scope of the invention. In this case, the distal end 88d of the Bowden cable 88 is fixedly coupled to a lever connector 88c'. The lever connector 88c' is fixedly coupled to the stud 28b projecting from the lower portion of a single release lever 28a. The synchronous release of both disc mechanisms 28 is achieved through the operative connection of the cross tube 30 between the disc mechanisms 28, as is well known in the art.

The vehicle seat 12 is typically retained in the design position (FIG. 3) during use by the occupant. However, the vehicle seat 12 can be selectively pivoted to the pitched forward position (FIG. 4) when ingress/egress behind the vehicle seat 12 is desired. Further, the vehicle seat 12 can be selectively pivoted back to the design position when the occupant desires to use the vehicle seat 12. The vehicle seat 12 includes disc mechanisms 28 operatively coupled between the seat cushion 16 and the seat base 18 configured to prevent rotation of the seat cushion 16 relative to the seat base 18 when the disc mechanisms 28 are in the locked condition. The seat cushion 16 is pivotable with respect to the seat base 18 when the disc mechanisms 28 are repositioned to an unlocked condition.

The pitch assembly 10 is operatively coupled to the vehicle seat 12 and is configured to reposition the disc mechanisms 28 to the unlocked condition prior to the pitch assembly 10 pivoting the vehicle seat 12 to the pitched forward position. In addition, the pitch assembly 10 is configured to allow the disc mechanisms 28 to relock in the pitch forward position. Further, the pitch assembly 10 is configured to reposition the disc mechanisms 28 to the unlocked condition prior to the pitch assembly 10 pivoting the vehicle seat 12 from the pitched forward position to the design position. Also, the pitch assembly 10 is configured to allow the disc mechanisms 28 to relock in the design position. It is to be appreciated that the pitch assembly 10 and the vehicle seat 12 can be configured such that the pitch assembly 10 pivots the vehicle seat 12 between one or more selectable positions, such as the design position, the pitched forward position, and other generally known positions such as a stowed position (not shown), a reclined position (not shown), and the like without varying the scope of the invention.

The process of pivoting the vehicle seat 12 to the pitched forward position from the design position is further described with respect to FIGS. 1-21. The vehicle seat 12 is initially in the design position for use by an occupant. Referring to FIG. 6, each disc mechanism 28 is configured such that applying tension to the secondary Bowden cable 88' in the direction of arrow 132 rotates the release lever 28a and repositions the disc mechanism 28 to the unlocked condition. While the disc mechanisms 28 are in the unlocked condition and the pinion actuator 56 is coupled to the drive pinion 43, rotation of the drive pinion 43 causes the pitch sector 32 to rotate which results in the seat cushion 16 pivoting between the design position shown in FIG. 3 and the pitched forward position shown in FIG. 4. The disc mechanisms 28 are spring biased such that when tension (arrow 132) is removed from the secondary Bowden cables 88' and from the release levers 28a, the disc mechanisms 28 are biased towards the locked condition. The disc mechanisms 28 are configured such that the disc mechanisms 28 are repositioned to the locked condition only when the disc mechanisms 28 are aligned with a locking position (not shown). The disc mechanisms 28 have a locking position (not shown) corresponding to the seat cushion 16 being in the design position. Thus, the disc mechanisms 28 are retained in the unlocked condition while the seat cushion 16 is pivoted away from the locking position (not shown) regardless of whether or not tension is applied to the secondary Bowden cables 88'. It is to be appreciated that the disc mechanisms 28 can include additional locking positions corresponding to alternate seat cushion 16 positions, such as the pitched forward position as a non-limiting example, without altering the scope of the invention. It is to be appreciated that in the embodiments wherein the disc mechanisms 28 include a plurality of locking positions, the disc mechanisms 28 can be repositioned to the locked condition when the disc mechanisms 28 are aligned with any one of the plurality of locking positions without varying the scope of the invention.

FIGS. 8 through 15 illustrate the movements of the various components of the pitch assembly 10 as the pitch assembly 10 repositions the disc mechanisms 28 to the unlocked condition prior to the pitch assembly 10 repositioning the vehicle seat 12 to the pitched forward position. FIGS. 8 through 11 illustrate details of the pitch assembly 10 in a design position with the seat cushion 16 in the design position and the disc mechanisms 28 in the locked condition.

Figure 8:
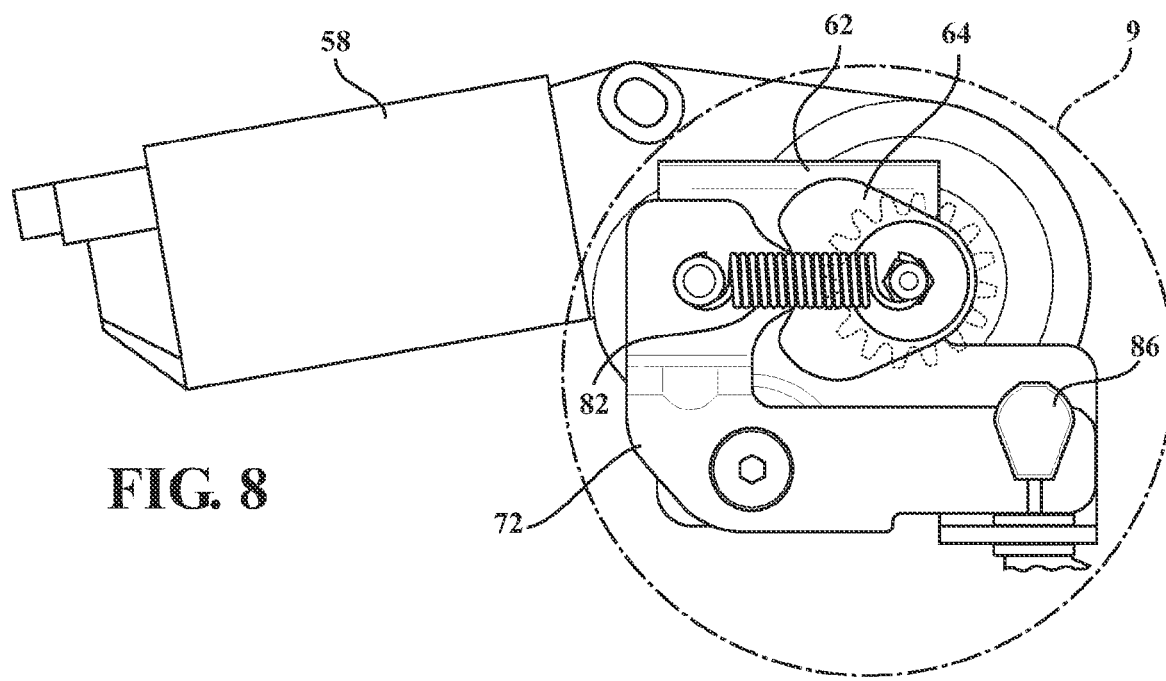
FIG. 8 is left side view of the pitch assembly of FIG. 5 including the drive motor with the pitch assembly in a design position.

Referring to FIGS. 8 and 9, the cam follower 72g is shown frictionally engaged with the cam profile 64b with the contact point 102 of the cam follower 72g aligned with the home position 110 of the cam profile 64b. The spring bias (arrow 134) within the return spring 82 keeps the cam follower 72g in frictional engagement with the cam profile 64b. The lower portion 72b of the actuator lever 72 is positioned in an unactuated position wherein tension is absent within the Bowden cable 88. As a result, tension is also absent in the secondary Bowden cables 88'. The disc mechanisms 28 are in the locked condition since the seat cushion 16 is in the design position and tension is absent in the Bowden cables 88, 88'.

As shown in FIGS. 10 and 11, the keys 56g, 56g' projecting from the pinion actuator 56 are spaced apart from the side walls 43g, 43g' of the slot 43a in the drive pinion 43 when the cam follower 72g is engaged with the home position 110 of the cam profile 64b. As such, the pinion actuator 56 is decoupled from the drive pinion 43 when the cam follower 72g is engaged with the home position 110. In addition, the gear strap 46 retains the drive pinion 43 in meshing engagement with the pitch sector 32 as depicted in FIG. 1. The seat cushion 16 is retained in the design position while the disc mechanisms 28 are in the locked condition. The pinion actuator 56 and the attached drive shaft 51 are free to rotate within the slot 43a of the drive pinion 43 within the dwell angle 130 in both clockwise and counterclockwise directions (as viewed in FIG. 11) prior to the pinion actuator 56 engaging with the drive pinion 43.

Figure 12:
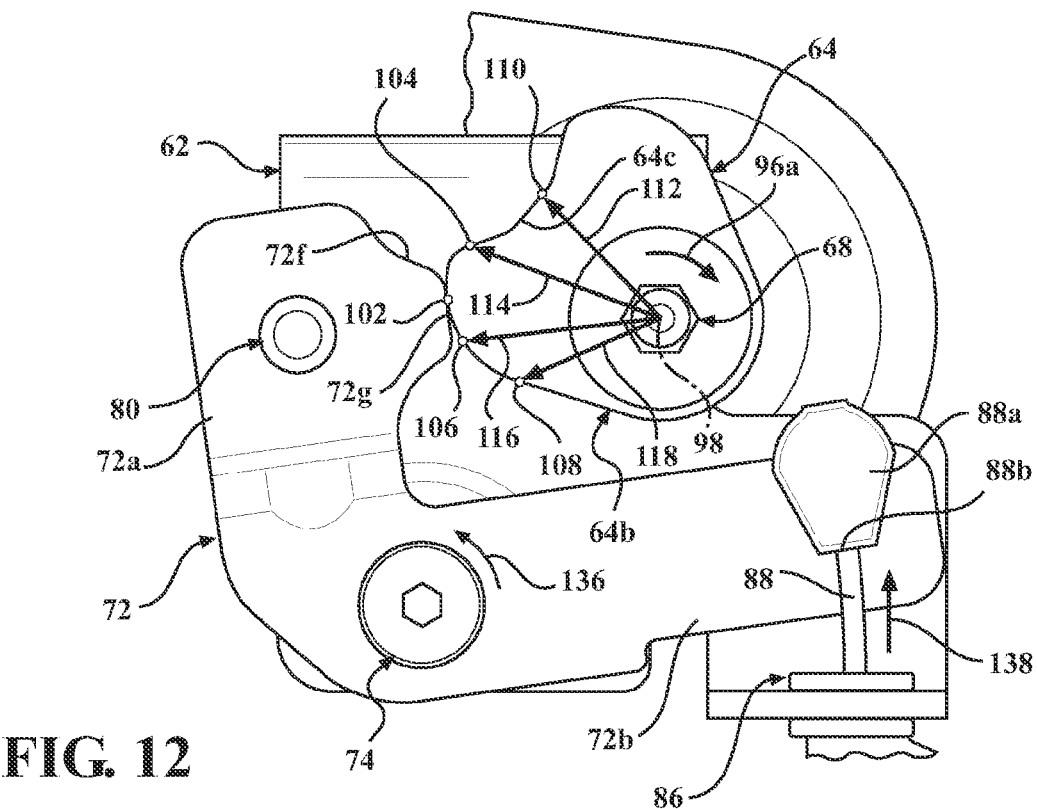
FIG. 12 is a left side view of the pitch assembly of FIG. 9, showing the cam partially rotated with the actuator lever rotated to an actuated position.

Referring to FIGS. 12 and 13, when the pitch assembly 10 is actuated to reposition the seat cushion 16 towards the pitched forward position, the drive motor 58 rotates the drive shaft 51 in the forward direction 96 (FIG. 5). Both the cam 64 and the pinion actuator 56 rotate with the drive shaft 51 since the drive shaft 51 is fixedly coupled to the cam 64 and the pinion actuator 56. However, since the pinion actuator 56 and the cam 64 are fixedly coupled to the respective lateral and medial ends 51b, 51c of the drive shaft 51, the forward direction 96 is portrayed as clockwise rotation 96a of the cam 64 as viewed in FIG. 12 and counterclockwise rotation 96b of the pinion actuator 56 as viewed in FIG. 13.

Referring to FIG. 12, as the drive motor 58 rotates the cam 64 in the clockwise direction 96a, the contact point 102 between the cam follower 72g and cam 64 is repositioned along the cam profile 64b towards the end point 108. The cam follower 72g is displaced away from the primary axis 98 of the cam 64 when the cam 64 is rotated in the clockwise direction 96a bringing the trigger point 104 into alignment with the cam follower 72g. The displacement of the cam follower 72g causes the actuator lever 72 to rotate counterclockwise (arrow 136) to an actuated position which pulls the proximal end 88b of the Bowden cable 88 towards the cam 64 (arrow 138). The counterclockwise rotation (arrow 136) of the actuator lever 72 applies tension to the Bowden cable 88. The Bowden cable 88 transfers the applied tension to the secondary Bowden cables 88'. The release levers 28a rotate in response to tension being applied to the Bowden cables 88, 88' and reposition the disc mechanisms 28 to the unlocked condition.

Since the unlatch angle 120 of the cam profile 64b is selected to be less than the dwell angle 130, the disc mechanisms 28 are repositioned to the unlocked condition while the pinion actuator 56 is disengaged from the drive pinion 43. The dwell portion 64d of the cam profile 64b is configured to retain the actuator lever 72 in the actuated position shown in FIG. 12 while the dwell portion 64d is in frictional contact with the cam follower 72g.

Additional forward rotation 96 of the drive shaft 51 rotates the pinion actuator 56 counterclockwise (arrow 96b) and causes the keys 56g, 56g' to frictionally engage with the slot 43a, as shown in FIG. 13. The pinion actuator 56 is coupled to the drive pinion 43 as long as the keys 56g, 56g' are frictionally engaged with the slot 43a. When the pinion actuator 56 is engaged with the drive pinion 43, forward torque (arrow 140) is applied to the drive pinion 43 by the keys 56g, 56g' in response to the rotation of the pinion actuator 56. After the pinion actuator 56 is coupled to the drive pinion 43, additional forward rotation 96 of the drive shaft 51 causes the drive pinion 43 to rotate in a counterclockwise direction, as illustrated by arrow 142 in FIG. 14. The pitch sector 32 rotates in a clockwise direction 144 as viewed in FIG. 14 in response to the counterclockwise rotation 142 of the drive pinion 43. The clockwise rotation 144 of the pitch sector 32 rotates the seat cushion 16 towards the pitched forward position.

Figure 15:
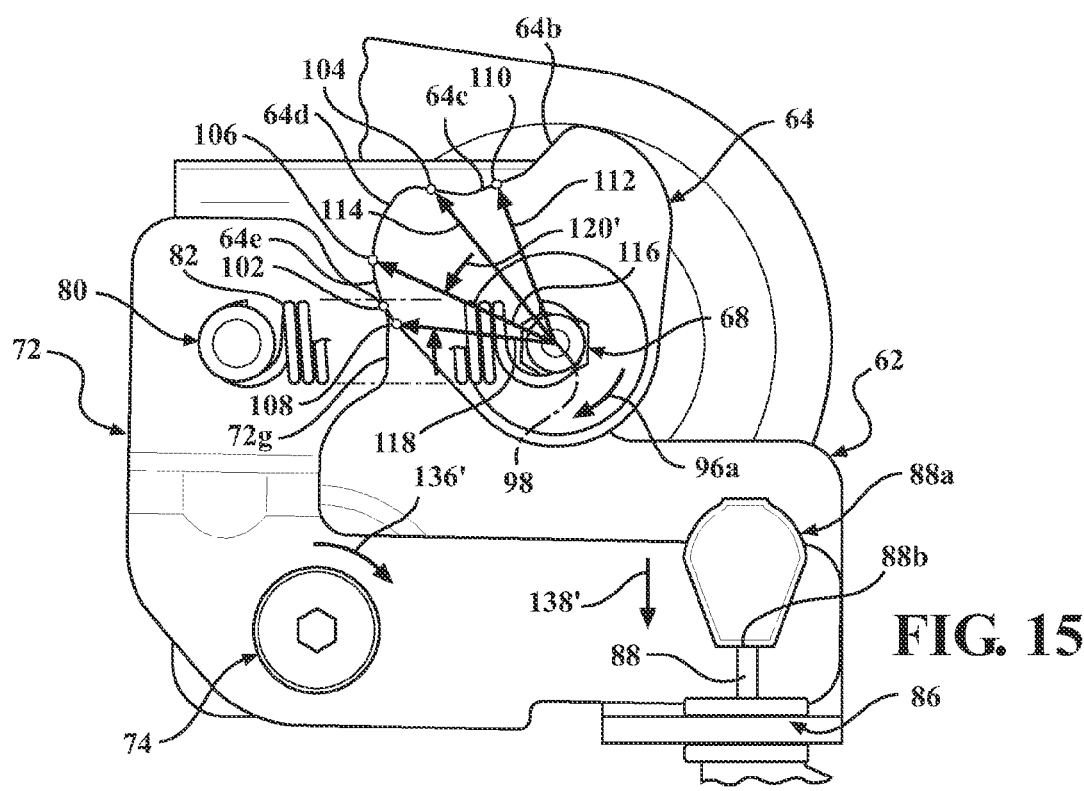
FIG. 15 is left side view of the pitch assembly of FIG. 12, showing the cam partially rotated and the actuator lever in an unactuated position.

Referring to FIG. 15, the dwell portion 64d of the cam profile 64b between the trigger point 104 and the release point 106 is configured such that the actuator lever 72 is held in the actuated position until the pinion actuator 56 couples with the drive pinion 43 and the drive pinion 43 is rotated at least a predetermined number of degrees to ensure that the seat cushion 16 is pivoted away from the design position.

As the cam 64 is rotated in the clockwise direction 96a, the contact point 102 between the cam follower 72g and the cam 64 is moved along the cam profile 64b past the release point 106 and into release portion 64e of the cam profile 64b. The cam follower 72g is moved closer to the primary axis 98 in response to the radial distance decreasing between the release point 106 and the end point 108. The actuator lever 72 is rotated in a clockwise direction 136' towards the unactuated position in response to the radial distance decreasing between the contact point 102 and the primary axis 98. The clockwise rotation 136' of the actuator lever 72 repositions the proximal end 88b of the Bowden cable 88 away from the cam 64, as illustrated by arrow 138' in FIG. 15. This removes the tension in the Bowden cables 88, 88' which also removes the tension applied to the release levers 28a by the Bowden cables 88, 88'. The disc mechanisms 28 are spring biased towards the locked condition such that the disc mechanisms 28 are relocked when the disc mechanisms 28 are aligned with a locking position. In the embodiment shown in FIG. 15, the disc mechanisms 28 include a single locking position corresponding to the seat cushion 16 being in the design position. Thus, the disc mechanisms 28 are retained in the unlocked condition while the seat cushion 16 is pivoted away from the design location. It is to be appreciated that the disc mechanisms 28 can include additional locking positions, including a locking position corresponding to the pitched forward position, without varying the scope of the invention. If the disc mechanisms 28 include a locking location corresponding the pitched forward location, the disc mechanisms 28 will automatically relock when the seat cushion 16 is pivoted to the pitched forward position since the tension has been removed from the Bowden cables 88, 88'.

The drive motor 58 continues to rotate the drive shaft 51 in the forward direction 96 until the seat cushion 16 is pivoted to the pitched forward position. As is generally known in the art, the drive motor 58 terminates rotation of the drive shaft 51 once the seat cushion 16 is pivoted to the pitched forward position. It is to be appreciated that when the seat cushion 16 arrives in the pitched forward position, the drive motor 58 optionally reverses rotational direction to disengage the pinion actuator 56 and the drive pinion 32 (FIG. 11) without varying the scope of the invention.

Figure 16:
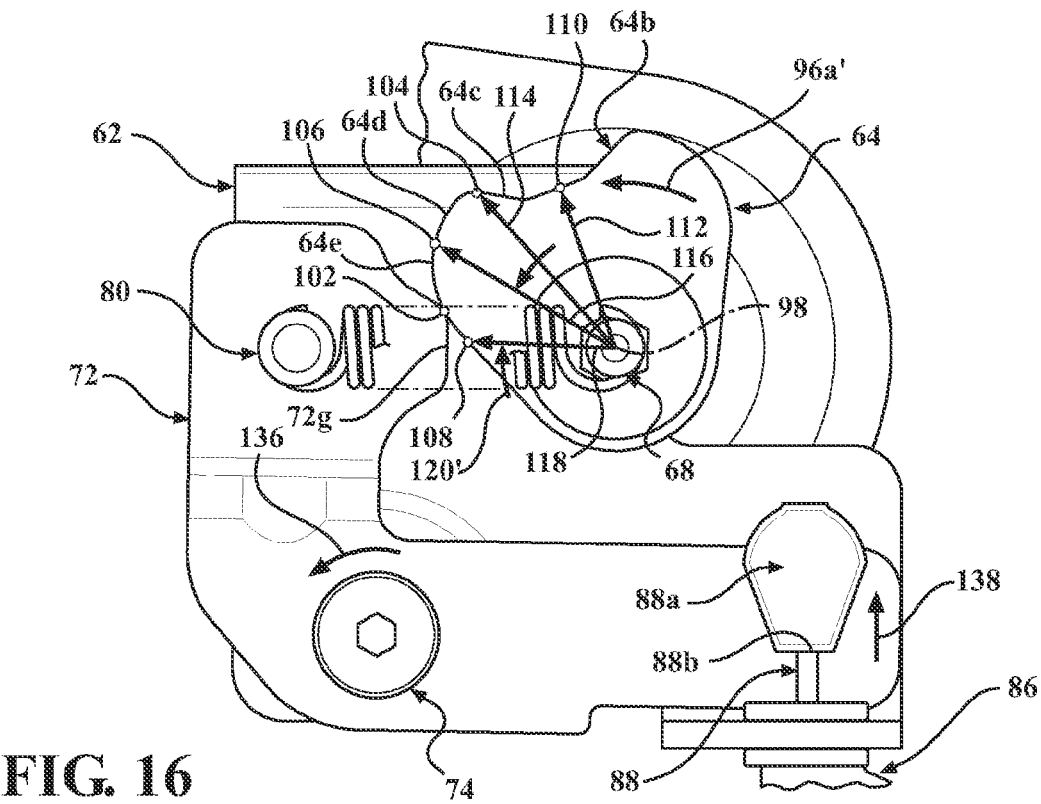
FIG. 16 is a left side view of the pitch assembly of FIG. 15, showing the cam partially rotated and the actuator lever in the unactuated position.
Figure 17:
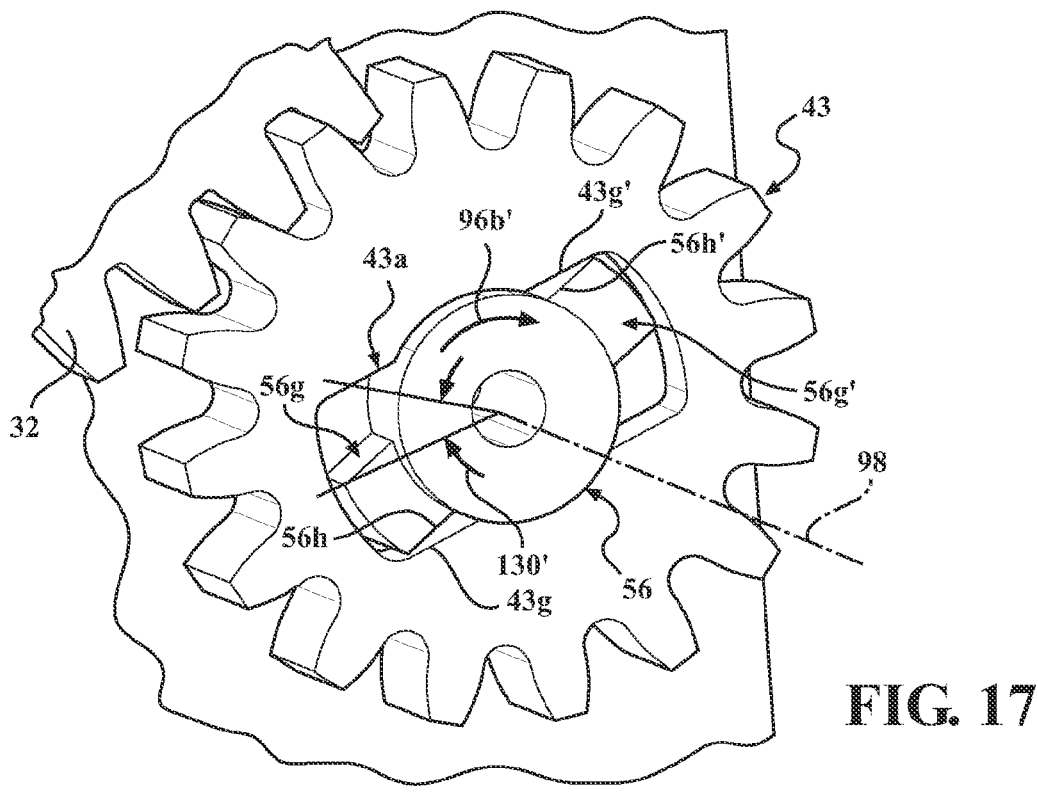
FIG. 17 is a right side view of the pitch assembly of FIG. 14, showing the pinion actuator being rotated in the clockwise direction.

The process of pivoting the vehicle seat 12 from the pitched forward position towards the design position is further described with respect to FIGS. 16-21. When the seat cushion 16 is in the pitched forward position and a return operation is initiated, the rotational movements of the cam 64, the pinion actuator 56, the drive pinion 43, and the pitch sector 32 are reversed to reposition the seat cushion 16 from the pitched forward position to the design position. When the return operation is initiated, the drive shaft 51 is rotated in a reverse direction 96' which rotates the cam 64 in a counterclockwise direction 96a' and rotates the pinion actuator 56 in a clockwise direction 96b', as shown in FIGS. 16 and 17 respectively. The rotation of the pinion actuator 56 in the clockwise direction 96b' disengages the keys 56g, 56g' from the slot 43a. The keys 56g, 56g' will engage with the slot 43a after the pinion actuator 56 is rotated through the reverse dwell angle 130'. The drive pinion 43 is stationary while the pinion actuator 56 is decoupled from the drive pinion 43.

Figure 18:
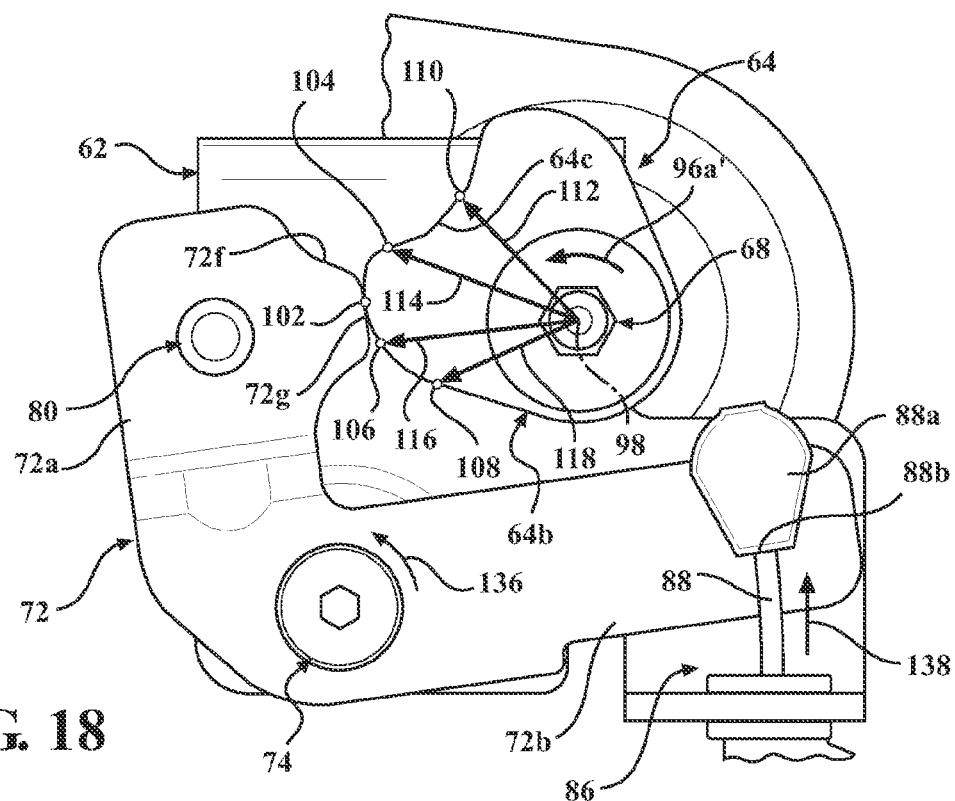
FIG. 18 is a left side view of the pitch assembly of FIG. 16, showing the cam partially rotated with the actuator lever in the actuated position.

As illustrated in FIGS. 16 and 18, the actuator lever 72 is rotated in the counterclockwise direction 136 as the release point 106 of the cam profile 64b is brought into contact with the cam follower 72g by the counterclockwise rotation 96a' of the cam 64. The counterclockwise rotation 136 of the actuator lever 72 pulls the proximal end 88b of the Bowden cable 88 towards the cam 64 in the direction of arrow 138. The rotation of the actuator lever 72 applies tension to the Bowden cables 88, 88' which apply tension to the release levers 28a. The release levers 28a are rotated by the tension in the respective Bowden cable 88' which ensures that the disc mechanisms 28 are in the unlocked condition prior to the pinion actuator 56 engaging with the drive pinion 43. The actuator lever 72 is retained in the actuated position while the cam 64 is rotated counterclockwise 96a' and the contact point 102 is engaged with the dwell portion 64d of the cam profile 64b.

Figure 19:
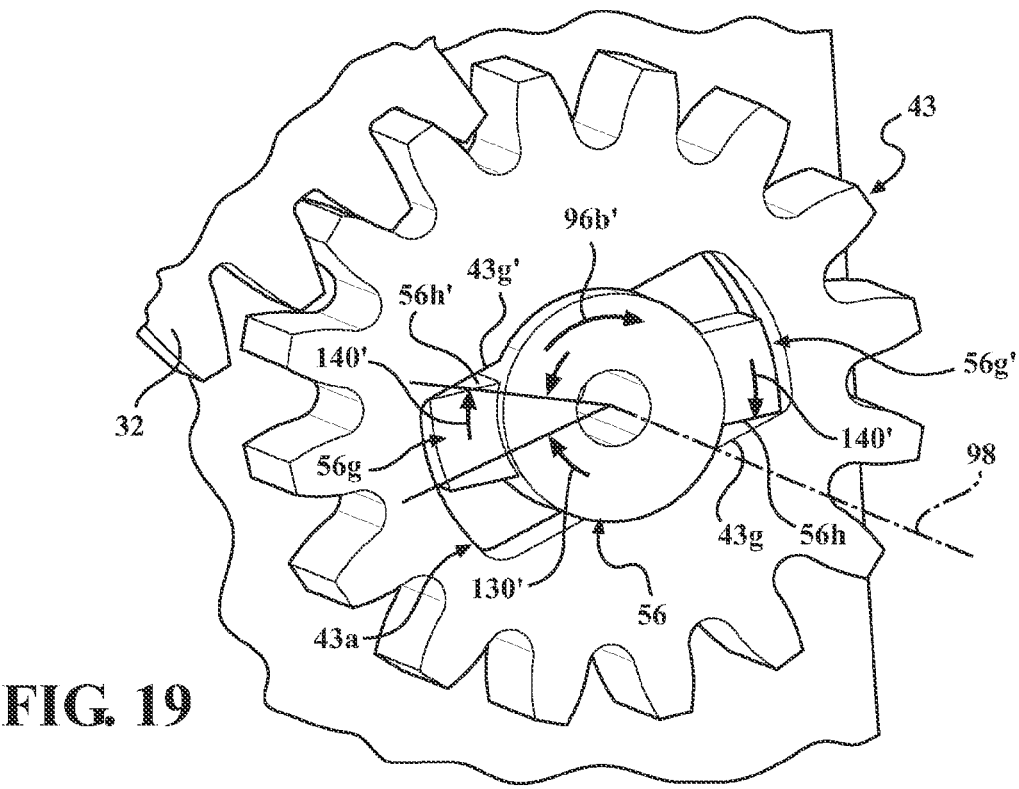
FIG. 19 is a right side view of the pitch assembly of FIG. 17, showing the pinion actuator partially rotated in the clockwise direction.

Additional rotation of the drive shaft 51 in the reverse direction 96' by the drive motor 58 causes the keys 56g, 56g' to frictionally engage with the side walls 43g, 43g' of the slot 43a in the drive pinion 43, as shown in FIG. 19. More specifically, the reverse dwell angle 130' is configured to be greater than the return unlatch angle 120' to ensure that the disc mechanisms 28 are in the unlocked condition prior to the pinion actuator 56 engaging with the drive pinion 43. It is to be appreciated that the return unlatch angle 120' can be approximately the same as the unlatch angle 120 if the pinion actuator 56 is returned to the disengaged condition (FIG. 11) with respect to the drive pinion 43 when the seat cushion 16 arrives in the pitched forward position, without varying the scope of the invention.

Figure 20:
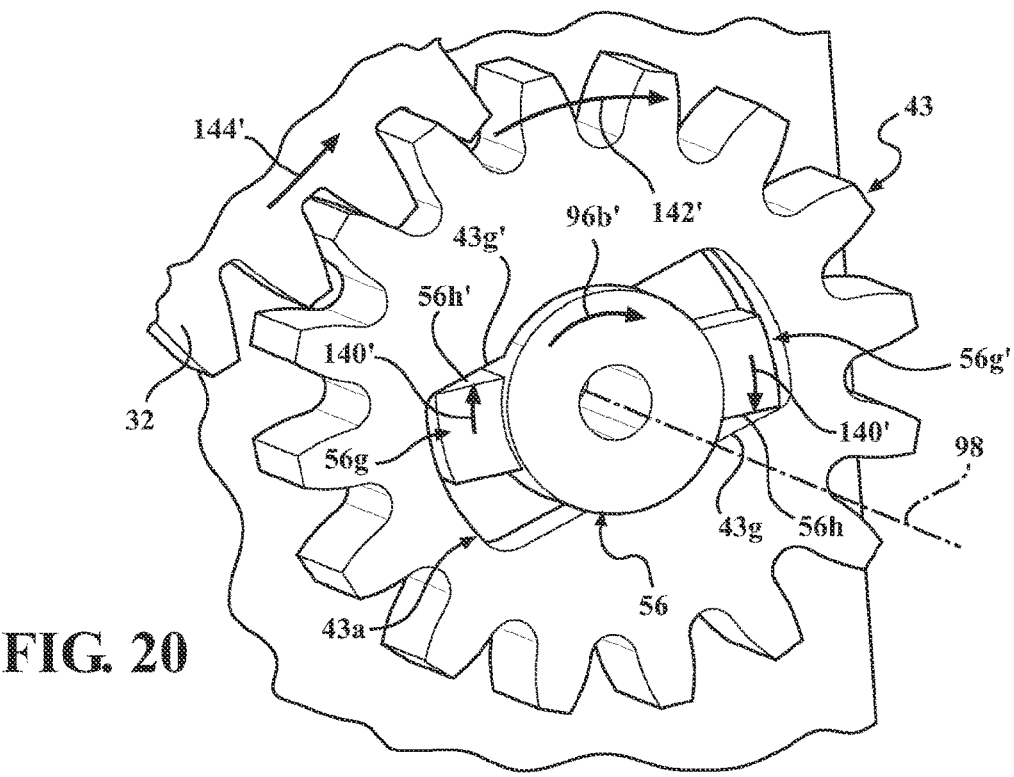
FIG. 20 is a right side view of the pitch assembly of FIG. 19, showing the pinion actuator and the drive pinion partially rotated in the clockwise direction.

The keys apply reverse torque 140' to the drive pinion 43 as the pinion actuator 56 is rotated in the clockwise direction 96b' after the pinion actuator 56 engages with the drive pinion 43, as illustrated in FIG. 20. Additional rotation of the pinion actuator 56 in the clockwise direction 96b' rotates the drive pinion 43 in the clockwise direction 142' which also rotates the pitch sector 32 in the counterclockwise direction 144'. The vehicle seat 12 is pivoted towards the design position from the pitch forward position by the rotation of the pitch sector 32 in the counterclockwise direction 144'.

Figure 21:
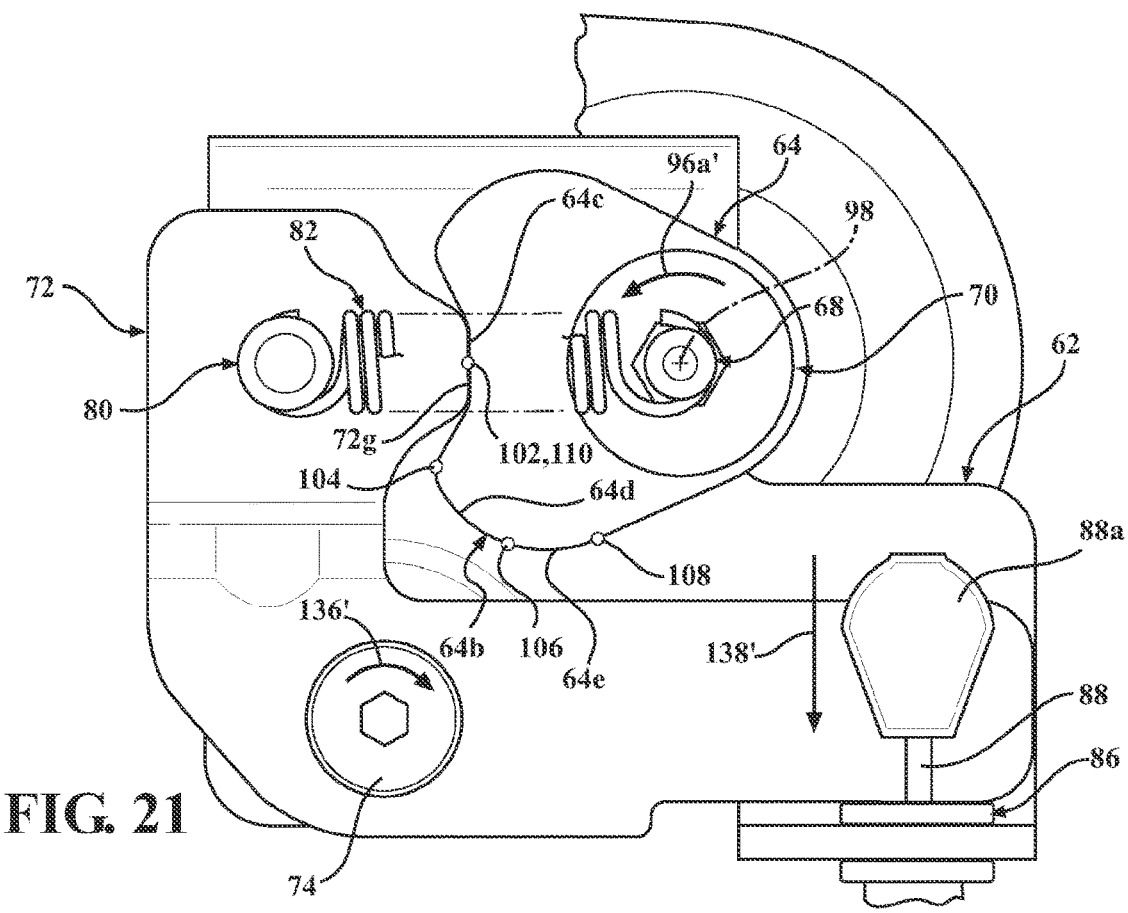
FIG. 21 is a left side view of the pitch assembly of FIG. 18, showing the cam in the design position with the actuator lever in the unactuated position.

Referring to FIG. 21, prior to the seat cushion 16 arriving in the design position, the counterclockwise rotation 96a' of the cam 64 brings trigger point 104 into contact with the cam follower 72g. As the cam 64 is further rotated in the counterclockwise direction 96a', the cam follower 72g is repositioned closer to the primary axis 98 as the contact point 102 with the cam follower 72g is moved toward the home position 110 along the cam profile 64b. This results in the actuator lever 72 rotating in the clockwise direction 136' to the unactuated position and moves the proximal end 88b of the Bowden cable 88 away from the cam 64 (arrow 138'). Rotating the actuator lever 72 to the unactuated position removes tension from the Bowden cables 88, 88' which also removes tension from the release levers 28a. The spring bias in the disc mechanisms 28 urge the disc mechanisms 28 towards the locked condition. However, the disc mechanisms 28 will be retained in the unlocked condition until the disc mechanisms 28 rotationally align with the locking position (not shown) corresponding to the seat cushion 16 positioned in the design position.

The drive motor 58 terminates rotation of the drive shaft 51 in the reverse direction 96' when the vehicle seat 12 is returned to the design position. Once the seat cushion 16 arrives at the design position with the disc mechanisms 28 rotationally aligning with the locking position (not shown), the disc mechanisms 28 will automatically be repositioned to the locked condition. It is to be appreciated that when the vehicle seat 12 is placed into the design position, the pinion actuator 56 can be retained in the engaged condition with the drive pinion 43 when the drive motor 58 terminates rotation of the drive shaft 51. Alternatively, the drive motor 58 can reverse rotation of the drive shaft 51 to return the pinon actuator 56 to the disengaged condition shown in FIG. 11 without altering the scope of the invention.

Figure 22:
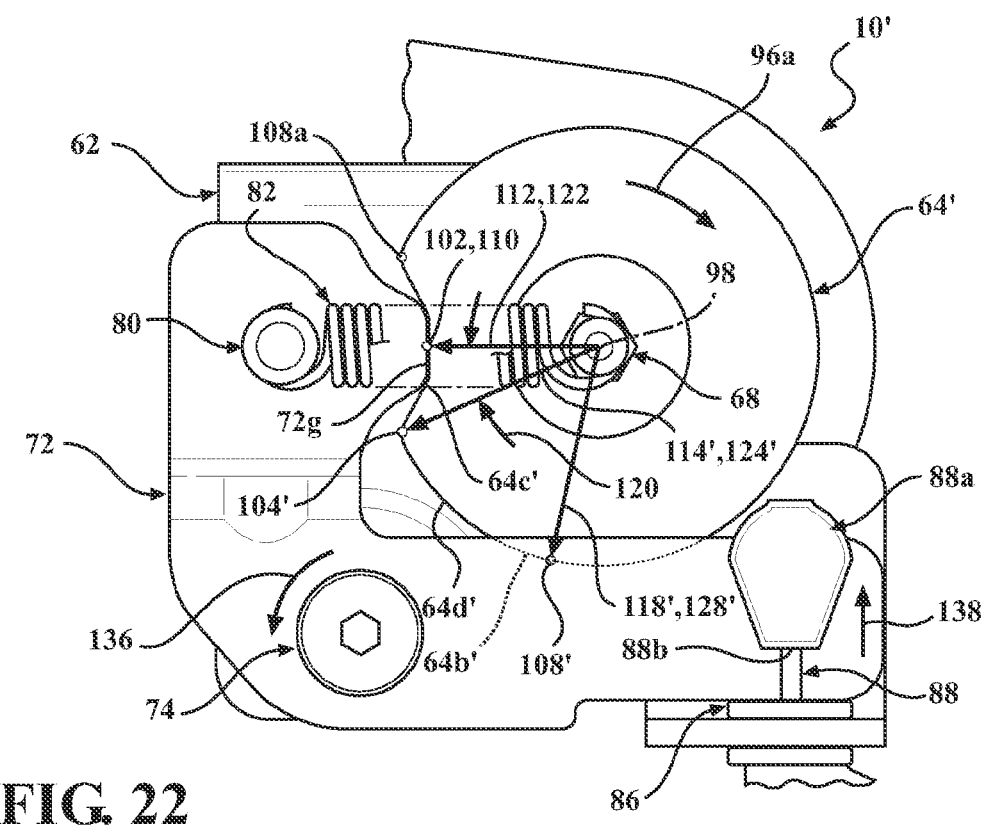
FIG. 22 is a left side view of the pitch assembly of FIG. 9, showing the cam in the design position and the actuator lever in the unactuated position according to a second embodiment of the present invention.
Figure 23:
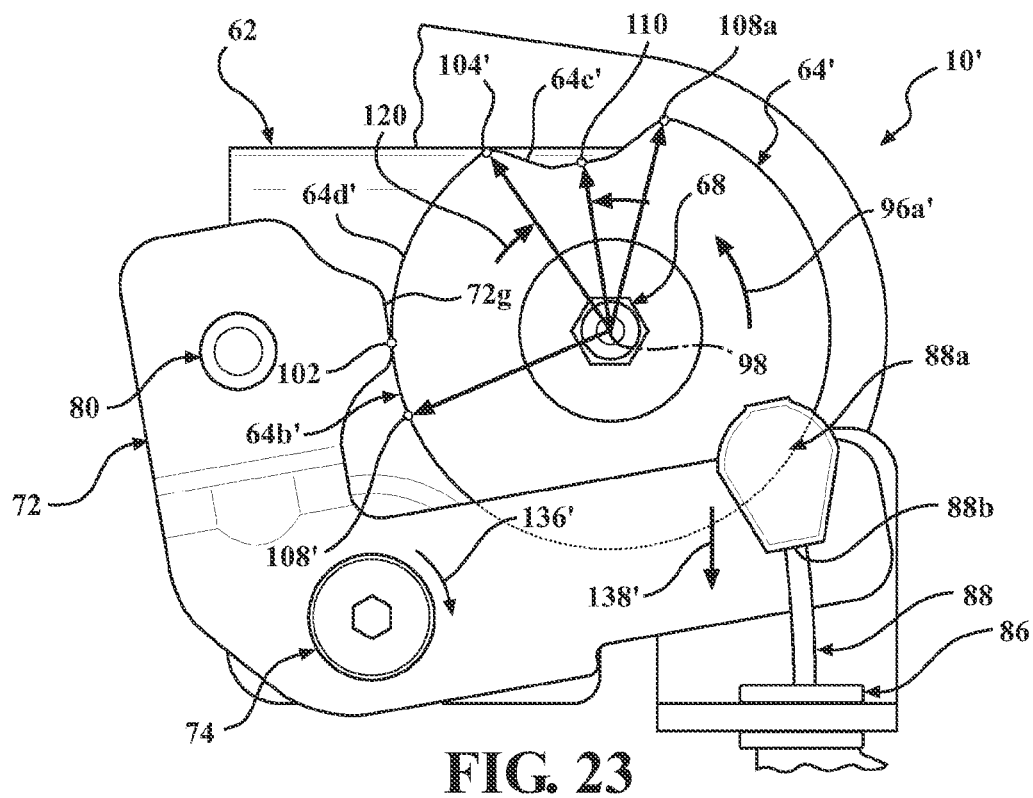
FIG. 23 is a left side view of the pitch assembly of FIG. 22, showing the cam partially rotated with the actuator lever in the actuated position.

A second embodiment of the pitch assembly 10' is shown in FIGS. 22 and 23. Elements in FIGS. 22 and 23 that are the same as those used above in FIGS. 1 through 21 have the same reference numbers for simplicity, while prime notations indicate similar elements. Only significant differences in relation to the embodiment shown in FIGS. 1-21 are highlighted below. The differences substantially involve the pitch assembly 10' retaining the disc mechanisms 28 in the unlocked condition while the vehicle seat 12 is rotated away from the design position.

Referring to FIG. 22, the pitch assembly 10' includes a cam 64' having a cam profile 64b' that is altered from the cam profile 64b in the first embodiment. More specifically, the cam profile 64b' includes a home position 110 spaced apart from the primary axis 98 by a radial distance 122 with an imaginary line extending between the home position 110 and the primary axis 98 defining a home angle 112. In addition, the cam profile 64b' includes a trigger point 104' spaced apart from the primary axis 98 by a radial distance 124' with an imaginary line extending between the trigger point 104' and the primary axis 98 defining an actuated angle 114'. Further, the cam profile 64b' includes an end point 108' spaced apart from the primary axis 98 by a radial distance 128' with an imaginary line extending between the end point 108' and the primary axis 98 defining an end angle 118'. The radial distance 122 is selected to be less than the radial distances 124' and 128'. In addition, the radial distance 124' is approximately the same as the radial distance 128'. The cam profile 64b' extending between the home position 110 and the trigger point 104' defines a home portion 64c' of the cam profile 64b'. Further, the cam profile 64b' extending between the trigger point 104' and the end point 108' defines a dwell portion 64d' of the cam profile 64b'. A relative angle between the home angle 112 and the actuated angle 114' defines an unlatch angle 120 of the cam 64'. The unlatch angle 120 of the cam 64' is preferably less than the dwell angle 130 and the reverse dwell angle 130' between the pinion actuator 56 and the slot 43a in the drive pinion 43.

FIGS. 22 and 23 illustrate the movements of various components of the pitch assembly 10' as the pitch assembly 10' repositions the vehicle seat 12 from the design position to the pitched forward position. The cam follower 72g is frictionally engaged with the home position 110 of the cam profile 64b' when the vehicle seat 12 is in the design position. Upon command from the occupant, the drive motor 58 rotates the cam 64' in the clockwise direction 96a as viewed in FIG. 22. The contact point 102 between the cam follower 72g and the cam profile 64b' glides along the cam profile 64b' towards the trigger point 104' as the cam 64' rotates in the clockwise direction 96a. The distance between the cam follower 72g and the primary axis 98 increases as the contact point 102 moves towards the trigger point 104'. The movement of the cam follower 72g away from the primary axis 98 causes the actuator lever 72 to rotate in the counterclockwise direction 136 around the pivot bolt 74. Rotating the actuator lever 72 in the counterclockwise direction 136 to an actuated position (shown in FIG. 23) pulls the proximal end 88b of the Bowden cable 88 towards the cam 64' (arrow 138 in FIG. 22). The movement of the Bowden cable 88 towards the cam 64' (arrow 138) applies tension to the Bowden cable 88. The applied tension in the Bowden cable 88 is transferred to the secondary Bowden cables 88' and to the respective release lever 28a on the disc mechanisms 28. The release levers 28a reposition the disc mechanisms 28 to the unlocked condition in response to the tension in the Bowden cables 88, 88'.

The actuator lever 72 is retained in the actuated position while the contact point 102 between the cam follower 72g and the cam profile 64b' is within the dwell portion 64d' of the cam profile 64b'. As illustrated by a maximum dwell point 108a shown in FIG. 22, the cam 64' can be rotated in the clockwise direction 96a almost a full rotation of the cam 64' while maintaining the actuator lever 72 in the actuated position. It is to be appreciated that the contact point 102 between the cam follower 72g and the cam 64' can be rotated past the maximum dwell point 108a in response to clockwise rotation 96a of the cam 64' without varying the scope of the invention. However, the actuator lever 72 will be repositioned to the unactuated position while the contact point 102 is between the maximum dwell point 108a and the trigger point 104' in response to clockwise rotation 96a of the cam 64'. Thus, the cam 64' can be rotated multiple revolutions in certain embodiments without altering the scope of the invention.

The return process is described in reference to FIG. 23. The contact point 102 between the cam follower 72g and the cam 64' is positioned along the dwell portion 64d' of the cam profile 64b' while the vehicle seat 12 is in the pitched forward position. The actuator lever 72 is retained in the actuated position with tension applied to the Bowden cables 88, 88'. The tension in the Bowden cables 88, 88' retains the disc mechanisms 28 in the unlocked condition.

Upon command from the occupant, the drive motor 58 rotates the cam 64' in the counterclockwise direction 96a'. The actuator lever 72 is retained in the actuated position during the counterclockwise rotation 96a' of the cam 64' while the contact point 102 is engaged with the dwell portion 64d' of the cam profile 64b'. The actuator lever 72 rotates in a clockwise direction 136' to the unactuated position in response to the counterclockwise rotation 96a' of the cam 64' when the contact point 102 is engaged with the home portion 64c' of the cam profile 64b'. The proximal end of the Bowden cable 88 is moved away from the cam 64' (arrow 138') by the actuator lever 72 rotating in the clockwise direction 136'. Tension is removed from the Bowden cables 88, 88' when the actuator lever 72 returns to the unactuated position.

Tension is also removed from the release levers 28a when tension is removed from the Bowden cables 88, 88'. The disc mechanisms 28 are repositioned to the locked condition when the disc mechanisms 28 are rotated to the locking position corresponding to the vehicle seat 12 being pivoted to the design position and tension is absent from the release levers 28a.

As discussed above, the pitch assembly 10, 10' of the present invention includes a cam 64, 64' configured to rotate an actuator lever 72 and reposition disc mechanisms 28 to the unlocked condition. In addition, the pitch assembly 10, 10' includes a pinion actuator 56 that is configured to engage with the drive pinion 43 after the disc mechanisms 28 are repositioned to the unlocked condition by the rotation of the cam 64, 64'. Further, the drive pinion 43 is operatively coupled to the vehicle seat 12 and configured to rotate the vehicle seat 12 between the design position and the pitched forward position. A drive motor 58 is operatively coupled to both the cam 64, 64' and the pinion actuator 56 to simultaneously rotate the cam 64, 64' and the pinion actuator 56. The pitch assembly 10, 10' of the present invention has a reduced cost over the known systems since the actuation assembly configured to unlock the disc mechanisms 28 has been eliminated. Further, the pitch assembly 10 of the present invention includes a relocking function to allow the disc mechanisms 28 to relock when the vehicle seat 12 is pivoted to the pitched forward position. In addition, the second embodiment of the pitch assembly 10' includes a hold open function wherein the disc mechanisms 28 are retained in the unlocked condition while the vehicle seat 12 is pivoted away from the design position.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

What is claimed is:

1. A pitch assembly for a vehicle seat that includes a seat cushion pivotably coupled to a seat base, a pitch sector operatively coupled to the seat cushion and configured to pivot the seat cushion relative to the seat base, a disc mechanism operatively coupled between the seat cushion and the seat base and configured to be repositionable between a locked condition preventing pivoting of the seat cushion relative to the seat base and an unlocked condition wherein the seat cushion is pivotable relative to the seat base between a first position and a second position, the pitch assembly comprising:
a drive pinion meshingly engaged to the pitch sector and including a slot, the slot including a slot wall;
a pinion actuator including a key extending therefrom, the pinion actuator extending at least partially through the slot in the drive pinion with the key positioned within the slot, the pinion actuator rotatable within the slot between an engaged condition wherein the key frictionally engages with the slot wall causing the drive pinion to rotate with the pinion actuator and a disengaged condition wherein the key is spaced apart from the slot wall decoupling the drive pinion from the pinion actuator such that the pinion actuator is rotatable relative to the drive pinion;
a cam having a cam profile;
a drive shaft fixedly coupled to the pinion actuator and fixedly coupled to the cam such that the pinion actuator, the drive shaft, and the cam have a common axis of rotation;
a drive motor operatively coupled to the drive shaft and configured to selectively rotate the drive shaft in a forward direction;
an actuator lever having a cam follower, the cam follower being retained in frictional engagement with the cam profile, the actuator lever rotatable between an unactuated position corresponding to the cam follower being frictionally engaged with a first portion of the cam profile and an actuated position corresponding to the cam follower being frictionally engaged with a second portion of the cam profile, the actuator lever operatively coupled to the disc mechanism such that the disc mechanism is in the unlocked condition when the actuator lever is in the actuated position and wherein the disc mechanism is repositionable towards the locked condition when the actuator lever is in the unactuated position;
wherein when the seat cushion is in the first position and the drive motor rotates the drive shaft in the forward direction, the cam is rotated in the forward direction causing the actuator lever to pivot to the actuated position and causing the disc mechanism to be repositioned to the unlocked condition prior to the key engaging with the slot in the drive pinion; and
wherein additional rotation of the drive shaft in the forward direction after the key frictionally engages with the slot wall rotates the drive pinion causing the pitch sector to pivot the seat cushion between the first position and the second position.

2. The pitch assembly as set forth in claim 1, wherein:
a radial distance between the cam profile and the axis of rotation is less within the first portion than within the second portion of the cam profile; and
the actuator lever being rotated to the unactuated position when the cam follower is in frictional contact with the first portion of the cam profile.

3. The pitch assembly as set forth in claim 2, wherein:
the cam follower of the actuator lever is spring biased towards the cam.

4. The pitch assembly as set forth in claim 3, wherein:
the slot includes opposing side walls; and
the pinion actuator is coupled to the drive pinion when the key frictionally engages with one of the opposing side walls.

5. The pitch assembly as set forth in claim 4, wherein:
a return spring operatively coupled between the actuator lever and the cam biases the actuator lever towards the cam.

6. The pitch assembly as set forth in claim 5, the disc mechanism further including a release lever operatively coupled to the actuator lever by a Bowden cable, wherein when the actuator lever is rotated the to the actuated position, tension is applied to the Bowden cable causing the release lever to reposition the disc mechanism to the unlocked condition.

7. The pitch assembly as set forth in claim 6, the disc mechanism configured to be repositionable to the locked condition corresponding to the first position of the seat cushion;
wherein the disc mechanism is automatically repositioned to the locked condition when the actuator lever is in the unactuated position and the seat cushion is in the first position; and
wherein the disc mechanism is retained in the unlocked condition after the actuator lever rotates from the actuated position to the unactuated position while the seat cushion is pivoted away from the first position.

8. The pitch assembly as set forth in claim 7, wherein:
when the cam follower is in frictional contact with the second portion of the cam profile with the actuator lever in the actuated position and the disc mechanism is in the unlocked condition, rotation of the drive shaft in a reverse direction by the drive motor causes the drive pinion to rotate in the reverse direction after the key is engaged with the slot and causes the pitch sector to pivot the seat cushion towards the first position.

9. The pitch assembly as set forth in claim 8, wherein:
when the cam follower is in frictional contact with the second portion of the cam profile and the drive shaft is rotated in the reverse direction by the drive motor bringing the cam follower into contact with the first portion of the cam profile, the actuator lever is rotated to the unactuated position allowing the disc mechanism to be repositioned to the locked condition.

10. The pitch assembly as set forth in claim 9, wherein:
when the actuator lever is in the unactuated position with the cam follower in frictional contact with the first portion of the cam profile and the drive shaft is rotated in the reverse direction by the drive motor, the disc mechanism automatically relocks when the seat cushion is pivoted to the first position.

11. The pitch assembly as set forth in claim 10, wherein:
when the drive shaft is being rotated by the drive motor in the reverse direction and the seat cushion is pivoted to the first position, the drive motor rotates the drive shaft in the forward direction causing the key to disengage from the slot.

12. The pitch assembly as set forth in claim 11, the cam profile further including a third portion; and
- each of the first, second, and third portions of the cam profile being different portions with the radial distance between the cam profile and the axis of rotation of the second portion being greater than the radial distance between the cam profile and the axis of rotation for the first and third portions;
- wherein when the cam follower is frictionally engaged with the third portion of the cam profile, the actuator lever is positioned in the unactuated position.

13. The pitch assembly as set forth in claim 12, wherein:
- when the seat cushion is in the second position and the actuator lever is in the unactuated position with the cam follower in frictional contact with the third portion of the cam profile, and the drive shaft is rotated in the reverse direction by the drive motor, the rotation of the cam in the reverse direction reposition the actuator lever to the actuated position causing the disc mechanism to be in the unlocked condition while the key of the pinion actuator is disengaged from the slot in the drive pinion; and
- additional rotation of the drive shaft in the reverse direction after the actuator lever is repositioned to the actuated position causes the key to engage with the slot coupling the pinion actuator to the drive pinion such that the drive pinion rotates with the pinion actuator causing the pitch sector to pivot the seat cushion from the second position and towards the first position.

14. The pitch assembly as set forth in claim 9, wherein the first position of the seat cushion is a design position and the second position is a pitched forward position.

15. The pitch assembly as set forth in claim 8, wherein the disc mechanism is configured to be repositionable to the locked condition corresponding to the second position of the seat cushion; and
- wherein the disc mechanism is repositioned to the locked condition after the actuator lever rotates from the actuated position to the unactuated position and the seat cushion is pivoted to the second position.

16. The pitch assembly as set forth in claim 8, wherein:
- the pinion actuator includes a second key spaced apart from the key;
- the slot being an elongated slot extending through the axis of rotation of the drive pinion; and
- the second key being positioned within the slot.

17. The pitch assembly as set forth in claim 8, wherein:
- the actuator lever is rotationally coupled to a bracket; and
- the cam is rotationally coupled to the bracket.

18. A vehicle seat for use in an automotive vehicle and repositionable between a design position and a pitched forward position, the vehicle seat comprising a seat cushion pivotably coupled to a seat base, a disc mechanism operatively coupled between the seat cushion and the seat base and configured to be repositionable between a locked condition preventing pivoting of the seat cushion relative to the seat base and an unlocked condition wherein the seat cushion is pivotable relative to the seat base, a pitch sector operatively coupled to the seat cushion, and a pitch assembly operatively coupled to the pitch sector and configured to rotate the pitch sector, the pitch assembly comprising:
- a drive pinion meshingly engaged to the pitch sector and including a slot, the slot including a slot wall;
- a pinion actuator includes a key extending therefrom, the pinion actuator extending at least partially through the slot in the drive pinion with the key positioned within the slot, the pinion actuator rotatable within the slot between an engaged condition wherein the key is frictionally engaged with the slot wall causing the drive pinion to rotate with the pinion actuator and a disengaged condition wherein the key is spaced apart from the slot wall so that the drive pinion is decoupled from the pinion actuator and the pinion actuator is rotatable relative to the drive pinion;
- a cam having a cam profile with a first cam portion and a second cam portion;
- a drive shaft fixedly coupled to the pinion actuator and fixedly coupled to the cam;
- a drive motor operatively coupled to the drive shaft and configured to selectively rotate the drive shaft; and
- an actuator lever having cam follower engaged with the cam profile and operatively coupled to the disc mechanism, wherein the actuator lever is in an unactuated position with the disc mechanism biased towards the locked condition when the cam follower is engaged with the first cam portion and wherein the actuator lever is an actuated position with the disc mechanism in the unlocked condition when the cam follower is engaged with the second cam portion;
- wherein when the drive motor initiates rotation of the drive shaft, the cam rotates the actuator lever to the actuated position causing the disc mechanism to be in the unlocked condition prior to the key frictionally engaging with the slot wall; and
- wherein additional rotation of the drive shaft causes the pitch sector to pivot the seat cushion between the design position and the pitched forward position.

19. The vehicle seat as set forth in claim 18, wherein:
the cam profile being configured such that the actuator lever is retained in the actuated position when the seat cushion is in the pitched forward position.

20. The vehicle seat as set forth in claim 18, wherein:
the cam profile being configured such that the actuator lever is rotated to the unactuated position when the seat cushion is in the pitched forward position.

21. The vehicle seat as set forth in claim 18, wherein:
the cam profile being configured such that the actuator lever is in the actuated position prior to the key engaging with the slot and coupling the pinion actuator to the drive pinion when the seat cushion is in the pitched forward position and the drive shaft is rotated in a reverse direction.

\* \* \* \* \*